(12) United States Patent
Ono

(10) Patent No.: US 12,168,317 B2
(45) Date of Patent: Dec. 17, 2024

(54) CONTROL DEVICE FOR INJECTION MOLDING MACHINE

(71) Applicant: SUMITOMO HEAVY INDUSTRIES, LTD., Tokyo (JP)

(72) Inventor: Hajime Ono, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 5 days.

(21) Appl. No.: 18/055,034

(22) Filed: Nov. 14, 2022

(65) Prior Publication Data
US 2023/0191677 A1 Jun. 22, 2023

(30) Foreign Application Priority Data

Dec. 16, 2021 (JP) ................................. 2021-204325

(51) Int. Cl.
*B29C 45/80* (2006.01)
*B29C 45/76* (2006.01)

(52) U.S. Cl.
CPC ...... *B29C 45/80* (2013.01); *B29C 2045/7606* (2013.01); *B29C 2945/761* (2013.01); *B29C 2945/76167* (2013.01); *B29C 2945/76187* (2013.01)

(58) Field of Classification Search
None
See application file for complete search history.

(56) References Cited

U.S. PATENT DOCUMENTS

| 5,792,395 A * | 8/1998 | Ito ........................... B29C 45/76 264/40.1 |
| 2008/0292738 A1* | 11/2008 | Cude ....................... B29C 45/80 425/150 |
| 2016/0158985 A1* | 6/2016 | Fitzpatrick .............. B29C 45/74 700/202 |
| 2020/0198201 A1* | 6/2020 | Shimokusuzono ... B29C 45/766 |
| 2023/0241824 A1* | 8/2023 | Hirano .................. B29C 45/768 425/135 |

FOREIGN PATENT DOCUMENTS

| DE | 10 2011 103 810 | 1/2012 |
| DE | 10 2017 009 046 | 3/2019 |
| JP | H06-071715 | 3/1994 |

* cited by examiner

*Primary Examiner* — Alison L Hindenlang
*Assistant Examiner* — Adrien J Bernard
(74) *Attorney, Agent, or Firm* — IPUSA, PLLC

(57) ABSTRACT

The present disclosure prevents load from being produced in an injection molding machine. The control device for an injection molding machine according to one embodiment of the present disclosure has a determining part that is configured to determine, based on information detected in accordance with a movement of a measurement motor provided in the injection molding machine, whether or not an operation of removing or attaching a screw that rotates in accordance with the measurement motor has been performed.

7 Claims, 10 Drawing Sheets

CONTROL DEVICE FOR INJECTION MOLDING MACHINE

CROSS-REFERENCE TO RELATED APPLICATION

This application claims priority to Japanese Patent Application No. 2021-204325, filed on Dec. 16, 2021, the entire contents of which are incorporated herein by reference.

BACKGROUND

1. Field of the Invention

The present disclosure relates to a control device for an injection molding machine.

2. Description of the Related Art

An injection molding machine is equipped with a cylinder, to which resin pellets are supplied as a molding material, and a heater, which heats the cylinder to melt the resin pellets. The injection molding machine manufactures a molded product by melting the resin pellets in the cylinder and by filling the cavity space inside a mold device with melted resin.

With conventional injection molding machines, a screw is replaced on an as-needed basis. Related art proposes a technique whereby, when replacing a screw, various allowable values and control values that are determined by the shape of the screw are displayed. The proposed technique also simplifies settings pertaining to the screw replacement. If a screw is removed or attached, it is likewise necessary to adjust the settings pertaining to the screw.

SUMMARY

A control device for an injection molding machine according to one embodiment of the present disclosure includes a determining part that is configured to determine, based on information detected in accordance with a movement of a measurement motor provided in the injection molding machine, whether or not an operation of removing or attaching a screw that rotates in accordance with the measurement motor has been performed.

DESCRIPTION OF EMBODIMENTS

Figure 1:
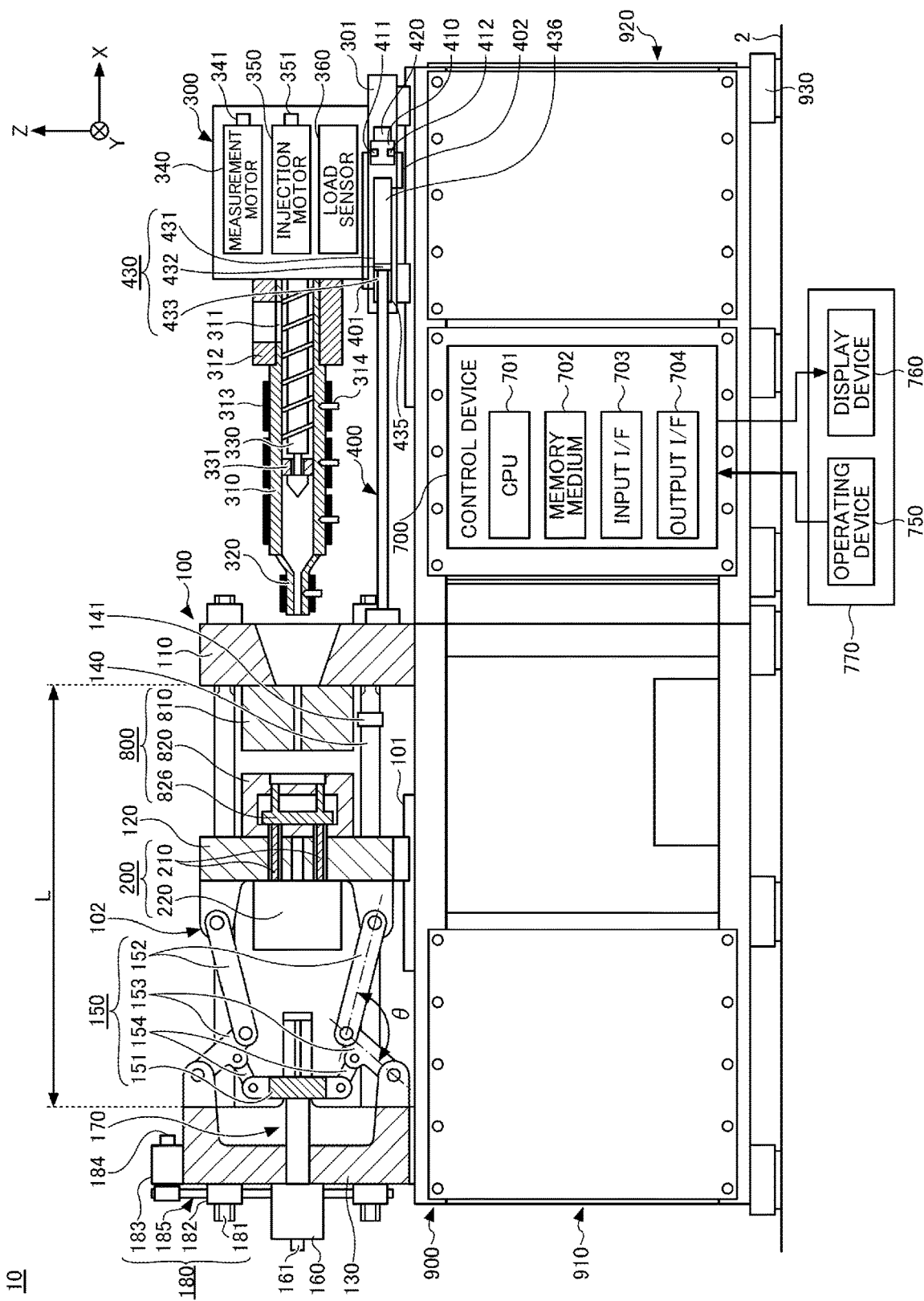
FIG. 1 is a diagram showing a state in which the mold of an injection molding machine according to an embodiment is fully open.

Hereinafter, an embodiment of the present invention will be described with reference to the accompanying drawings. Note that, throughout the drawings, the same reference numerals may be assigned the same or corresponding codes, and the description thereof may be omitted.

With an injection molding machine, even if a screw is removed or attached and the settings pertaining to the screw are changed, such changes are difficult to detect.

In view of the above problem, it is therefore desirable to provide a technique, whereby a screw's removal or attachment is detected automatically, and whereby, when this detection is made, the screw's settings are not changed, so as to prevent load from being produced in the injection molding machine.

(Injection Molding Machine)

Figure 2:
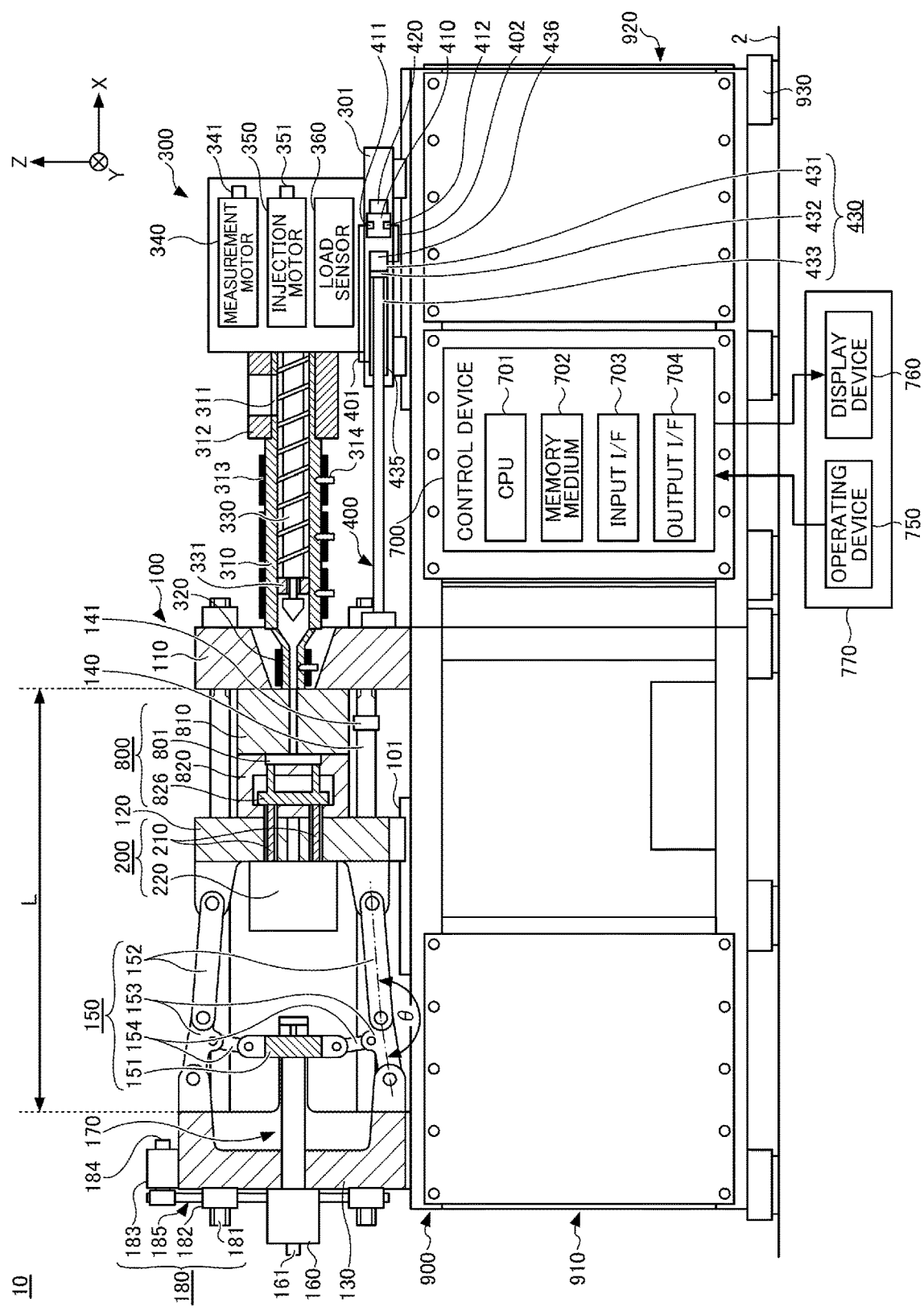
FIG. 2 is a diagram showing a state in which the mold of the injection molding machine according to the embodiment is clamped.

FIG. 1 is a diagram showing a state of an injection molding machine when a mold is fully open, according to one embodiment. FIG. 2 is a diagram showing the injection molding machine according to one embodiment, where the mold is clamped. In this specification, the X-axis direction, the Y-axis direction, and the Z-axis direction perpendicular to each other. The X-axis direction and the Y-axis direction represent the horizontal direction, and the Z-axis direction represents the vertical direction. When the clamping device 100 is a horizontal type, the X-axis direction is the direction in which the mold opens and closes, and the Y-axis direction is the width direction of the injection molding machine 10. The negative Y-axis direction side will be hereinafter referred to as "the operating side," and the positive Y-axis direction side will be referred to as "the non-operating side."

As shown in FIG. 1 and FIG. 2, the injection molding machine 10 includes: a clamping device 100 that opens and closes a mold device 800; an ejector device 200 that ejects the molded product molded by the mold device 800; an injection device 300 that injects the molding material into the mold device 800; a move device 400 that moves the injection device 300 forward and backward with respect to the mold device 800; a control device 700 that controls each component of the injection molding machine 10; and a frame 900 that supports each component of the injection molding machine 10. The frame 900 includes: a clamping device frame 910 that supports the clamping device 100; and an injection device frame 920 that supports the injection device 300. The clamping device frame 910 and the injection device frame 920 are each installed on a floor 2 via a leveling adjuster 930. The control device 700 is arranged in the inner space of the injection device frame 920. Each component of the injection molding machine 10 will be described below.

(Clamping Device)

In the description of the clamping device 100, the direction in which the movable platen 120 moves when closing the mold (for example, the positive X-axis direction) will be defined as the front, and the direction in which the movable platen 120 moves when opening the mold (for example, the negative X-axis direction) will be defined as the rear.

The clamping device 100 closes, pressurizes, clamps, depressurizes, and opens the mold device 800. The mold device 800 includes a fixed mold 810 and a movable mold 820.

The clamping device 100 is, for example, a horizontal type, and the direction in which the mold opens and closes is the horizontal direction. The clamping device 100 includes: a fixed platen 110 to which the fixed mold 810 is attached; a movable platen 120 to which the movable mold 820 is fixed; and a move mechanism 102 for moving the movable platen 120 with respect to the fixed platen 110 in the direction in which the mold opens and closes.

A fixed platen 110 is fixed to the clamping device frame 910. A fixed mold 810 is attached to the surface of the fixed platen 110 facing the movable platen 120.

The movable platen 120 is arranged on the clamping device frame 910 so as to be free to move in the direction in which the mold opens and closes. A guide 101 for guiding the movable platen 120 is laid on the clamping device frame 910. The movable mold 820 is attached to the surface of the movable platen 120 facing the fixed platen 110.

The move mechanism 102 moves the movable platen 120 forward and backward with respect to the fixed platen 110, thereby closing, pressurizing, clamping, depressurizing, and opening the mold of the mold device 800. The move mechanism 102 includes: a toggle support 130 that is arranged at a distance with respect to the fixed platen 110; a tie bar 140 that connects the fixed platen 110 and the toggle support 130; a toggle mechanism 150 that moves the movable platen 120 in the direction in which the mold opens and closes, with respect to the toggle support 130; a clamping motor 160 that activates the toggle mechanism 150; a motion conversion mechanism 170 that converts the rotational motion of the clamping motor 160 into linear motion; and a mold thickness adjusting mechanism 180 that adjusts the distance between the fixed platen 110 and the toggle support 130.

The toggle support 130 is provided at a distance from the fixed platen 110, and mounted on the clamping device frame 910 so as to be free to move in the direction in which the mold opens and closes. Note that the toggle support 130 may be arranged so as to be free to move along a guide laid on the clamping device frame 910. The guide for the toggle support 130 may be the same as the guide 101 for the movable platen 120.

Note that, with the present embodiment, the fixed platen 110 is fixed to the clamping device frame 910, and the toggle support 130 is arranged on the clamping device frame 910 so as to be free to move in the direction in which the mold opens and closes. However, it is equally possible to fix the toggle support 130 to the clamping device frame 910, and arrange the fixed platen 110 on the clamping device frame 910 so as to be free to move in the direction in which the mold opens and closes.

The tie bar 140 connects the fixed platen 110 and the toggle support 130 at a distance L in the direction in which the mold opens and closes. A plurality of (for example, four) tie bars 140 may be used here. The multiple tie bars 140 are arranged parallel to the direction in which the mold opens and closes, and extend in accordance with the clamping force. At least one tie bar 140 may be provided with a tie-bar strain sensor 141 that detects the strain of the tie bar 140. The tie-bar strain sensor 141 sends a signal indicating the detection result to the control device 700. The detection result of the tie-bar strain sensor 141 is used to detect the clamping force and the like.

Note that, with the present embodiment, the tie-bar strain sensor 141 is used as a clamping force sensor for detecting the clamping force, but the present invention is by no means limited to this. That is, the clamping force sensor is by no means limited to the strain gauge type, but may be a piezoelectric type, a capacitive type, a hydraulic type, an electromagnetic type, and so forth, and, furthermore, its mounting position is not limited to a tie bar 140 either.

The toggle mechanism 150 is arranged between the movable platen 120 and the toggle support 130, and moves the movable platen 120 in the direction in which the mold opens and closes, with respect to the toggle support 130. The toggle mechanism 150 includes a crosshead 151 that moves in the direction in which the mold opens and closes, and a pair of link sets that bend and stretch as the crosshead 151 moves. Each set of links includes first links 152 and second links 153 which are connected by using pins or the like so as to be free to bend and stretch. The first links 152 are attached to the movable platen 120 with pins or the like so as to be free to swing. The second links 153 are attached to the toggle support 130 with pins or the like so as to be free to swing. The second links 153 are attached to the crosshead 151 via third links 154. When the crosshead 151 is moved forward or backward with respect to the toggle support 130, the first links 152 and the second links 153 bend and stretch, and the movable platen 120 moves forward or backward with respect to the toggle support 130.

Note that the configuration of the toggle mechanism 150 is by no means limited to the configurations shown in FIG. 1 and FIG. 2. For example, although the number of nodes in each set of links is five in FIG. 1 and FIG. 2, this may be four, and one end part of the third link 154 may be connected to a node between a first link 152 and a second link 153.

A clamping motor 160 is attached to the toggle support 130 to activate the toggle mechanism 150. The clamping motor 160 moves the crosshead 151 forward and backward with respect to the toggle support 130, thereby making the first links 152 and the second links 153 bend and stretch, and allowing the movable platen 120 to move forward and backward with respect to the toggle support 130. The clamping motor 160 is directly connected to the motion conversion mechanism 170, but may be connected to the motion conversion mechanism 170 via a belt, a pulley and the like.

The motion conversion mechanism 170 converts the rotational motion of the clamping motor 160 into linear motion of the crosshead 151. The motion conversion mechanism 170 includes a screw shaft, and a screw nut that is screwed into the screw shaft. A ball or a roller may be interposed between the screw shaft and the screw nut.

The clamping device 100 performs a mold-closing step, a pressurizing step, a clamping step, a depressurizing step, a mold-opening step, and so forth, under the control of the control device 700.

In the mold-closing step, the clamping motor 160 is driven to move the crosshead 151 forward at a set moving speed, to the position where the mold is completely closed, thereby moving the movable platen 120 forward and making the movable mold 820 touch the fixed mold 810. The position and moving speed of the crosshead 151 are detected by using, for example, a clamping motor encoder 161 or the like. The clamping motor encoder 161 detects the rotation of the clamping motor 160, and sends a signal indicating the detection result, to the control device 700.

Note that, as for the crosshead position sensor for detecting the position of the crosshead 151 and the crosshead moving speed sensor for detecting the moving speed of the crosshead 151, these are by no means limited to the clamping motor encoder 161, and more general ones can be used. Also, as for the movable platen position sensor for detecting the position of the movable platen 120 and the movable platen moving speed sensor for detecting the moving speed of the movable platen 120, these are by no means limited to the clamping motor encoder 161, and more general ones can be used.

In the pressurizing step, the clamping motor 160 is further driven to move the crosshead 151 farther forward from the position where the mold is completely closed, to the clamping position, thereby generating a clamping force.

In the clamping step, the clamping motor 160 is driven to keep the crosshead 151 at the clamping position. In the clamping step, the clamping force generated in the pressurizing step is maintained. In the clamping step, a cavity space 801 (see FIG. 2) is formed between the movable mold 820 and the fixed mold 810, and the injection device 300 fills the cavity space 801 with a liquid molding material. A molded product is obtained as the filled molding material solidifies.

There may be one cavity space 801 or multiple cavity spaces 801. In the latter case, a plurality of molded products can be obtained at a time. An insert material may be placed in one part of the cavity space 801, and another part of the cavity space 801 may be filled with the molding material. By this means, a molded product in which the insert material and the molding material are integrated as one can be made.

In the depressurizing step, the clamping motor 160 is driven to move the crosshead 151 backward from the clamping position to the position where the mold starts opening, thereby moving the movable platen 120 backward and reducing the clamping force. The position where the mold starts opening and the position where the mold is completely closed may be the same position.

In the mold-opening step, the clamping motor 160 is driven to move the crosshead 151 backward, at a set moving speed, from the position where the mold starts opening to the position where the mold is fully open, thereby moving the movable platen 120 backward and separating the movable mold 820 from the fixed mold 810. Subsequently, the ejector device 200 ejects the molded product from the movable mold 820.

The settings in the mold-opening step, the pressurizing step, and the clamping step are set together as a series of settings. For example, the moving speed, the position, and the clamping force of the crosshead 151 in the mold-opening step and the pressurizing step (including the position where the mold starts closing, the position where the moving speed is switched, the position where the mold is completely closed, and the clamping position) are set together as a series of settings. The position where the mold starts closing, the position where the moving speed is switched, the position where the mold is completely closed, and the clamping position are arrayed in this order, from the rear to the front, and represent the starting and ending points of sections where the moving speed is set. The moving speed is set per section. The moving speed may be switched at one position or may be switched at a number of positions. The position to switch the moving speed need not be set. Either one of the clamping position or the clamping force may be set.

The settings in the depressurizing step and the mold-opening step are set similarly. For example, the moving speed and the position of the crosshead 151 in the depressurizing step and the mold-opening step (including the position where the mold starts opening, the position where the moving speed is switched, and the position where the mold is fully open) are set together as a series of settings. The position where the mold starts opening, the position where the moving speed is switched, and the position where the mold is fully open are arrayed in this order, from the front to the rear, and represent the starting and ending points of sections where the moving speed is set. The moving speed is set per section. The moving speed may be switched at one position or may be switched at a number of positions. The position to switch the moving speed need not be set. The position where the mold starts opening and the position where the mold is completely closed may be the same position. Also, the position where the mold is fully open and the position where the mold begins to close may be the same position.

Note that, instead of the moving speed and the position of the crosshead 151, the moving speed and the position of the movable platen 120 may be set. Also, the clamping force may be set instead of the position of the crosshead (for example, the clamping position) or the position of the movable platen.

Now, the toggle mechanism 150 amplifies the driving force of the clamping motor 160 and sends this to the movable platen 120. The rate of this magnification is also referred to as "toggle magnification." The toggle magnification changes according to an angle $\theta$ that is formed between the first link 152 and the second link 153 (hereinafter also referred to as "link angle $\theta$"). Link angle $\theta$ can be determined from the position of the crosshead 151. The toggle magnification becomes the largest when link angle $\theta$ is 180 degrees.

When the thickness of the mold device 800 changes due to replacement of the mold device 800 or a change in the temperature of the mold device 800, the thickness of the mold is adjusted so that a predetermined clamping force can be obtained when clamping the mold. In adjusting the thickness of the mold, for example, distance L between the fixed platen 110 and the toggle support 130 is adjusted such that link angle $\theta$ in the toggle mechanism 150 becomes a predetermined angle upon mold touch, which is when the movable mold 820 touches the fixed mold 810.

The clamping device 100 includes a mold thickness adjusting mechanism 180. The mold thickness adjusting mechanism 180 adjusts the mold's thickness by adjusting distance L between the fixed platen 110 and the toggle support 130. Note that the time for adjusting the mold's thickness is provided, for example, between the end of a molding cycle and the start of the next molding cycle. The mold thickness adjusting mechanism 180 includes, for example: a screw shaft 181 that is formed in the rear end part of the tie bar 140; a screw nut 182 that is held by the toggle support 130 so as to be free to rotate and unable to move forward and backward; and a mold thickness adjusting motor 183 that rotates the screw nut 182 that is screwed into the screw shaft 181.

A screw shaft 181 and a screw nut 182 are provided for each tie bar 140. The rotational driving force of the mold thickness adjusting motor 183 may be transmitted to a plurality of screw nuts 182 via a rotational drive force transmission part 185. These screw nuts 182 can rotate synchronously. Note that it is also possible to rotate multiple screw nuts 182 individually by changing the transmission path of the rotational drive force transmission part 185.

The rotational drive force transmission part 185 may be composed of gears and the like, for example. In this case, passive gears are formed on the outer periphery of each screw nut 182, a drive gear is attached to the output shaft of the mold thickness adjusting motor 183, and an intermediate gear that meshes with a plurality of passive gears and drive gears is held in the center part of the toggle support 130 in a rotatable fashion. Note that the rotational drive force transmission part 185 may be composed of belts, pulleys, or the like, instead of gears.

The operation of the mold thickness adjusting mechanism 180 is controlled by the control device 700. The control device 700 drives the mold thickness adjusting motor 183 to rotate the screw nut 182. As a result of this, the position of the toggle support 130 with respect to the tie bar 140 is adjusted, and distance L between the fixed platen 110 and the toggle support 130 is adjusted. Note that multiple mold thickness adjusting mechanisms may be used in combination.

The distance L is detected using the mold thickness adjusting motor encoder 184. The mold thickness adjusting motor encoder 184 detects the amount of rotation, the direction of rotation, and so forth of the mold thickness adjusting motor 183, and sends signals indicating these detection results to the control device 700. The detection results of the mold thickness adjusting motor encoder 184 are used to monitor and control the position of the toggle support 130 and distance L. Note that the toggle support position sensor for detecting the position of the toggle support 130 and the distance sensor for detecting distance L are by no means limited to the mold thickness adjusting motor encoder 184, and more general ones can be used.

The clamping device 100 may include a metallic mold temperature adjustor for adjusting the temperature of the mold device 800. The mold device 800 has, in its inside, a channel for a temperature control medium. The metallic mold temperature adjustor adjusts the temperature of the mold device 800 by adjusting the temperature of the temperature control medium supplied to the channel in the mold device 800.

Note that, although the clamping device 100 of this embodiment is a horizontal type in which the mold opens and closes horizontally, the clamping device 100 may also be a vertical type in which the mold opens and closes vertically.

Also, although the clamping motor 160 serves as a drive source in the clamping device 100 of this embodiment, an oil-pressure cylinder may be provided instead of the clamping motor 160. Also, the clamping device 100 may include a linear motor for opening and closing the mold and an electromagnet for clamping the mold.

(Ejector Device)

In the description of the ejector device 200, as in the description of the clamping device 100, the direction in which the movable platen 120 moves when closing the mold (for example, the positive X-axis direction) is defined as the front, and the direction in which the movable platen 120 moves when opening the mold (for example, the negative X-axis direction) is defined as the rear.

The ejector device 200 is attached to the movable platen 120, and moves forward and backward with the movable platen 120. The ejector device 200 includes: an ejector rod 210 for ejecting the molded product from the mold device 800; and a drive mechanism 220 for moving the ejector rod 210 in the direction in which the movable platen 120 moves (the X-axis direction).

The ejector rod 210 is disposed in a through-hole of the movable platen 120 so as to be free to move forward and backward. The front-end part of the ejector rod 210 contacts the ejector plate 826 of the movable mold 820. The front-end part of the ejector rod 210 may or may not be connected with the ejector plate 826.

The drive mechanism 220 includes, for example: an ejector motor; and a motion conversion mechanism that converts the rotational motion of the ejector motor into linear motion of the ejector rod 210. The motion conversion mechanism includes a screw shaft and a screw nut that is screwed into the screw shaft. A ball or a roller may be interposed between the screw shaft and the screw nut.

The ejector device 200 performs an ejection step under the control of the control device 700. In the ejection step, the ejector rod 210 is moved from the standby position to the ejection position at a set moving speed, thereby moving the ejector plate 826 forward and ejecting the molded product. Subsequently, the ejector motor is driven to move the ejector rod 210 backward at a set moving speed, and the ejector plate 826 is moved backward to the original standby position.

The position and moving speed of the ejector rod 210 are detected by using, for example, an ejector motor encoder. The ejector motor encoder detects the rotation of the ejector motor and sends a signal indicating the detection result to the control device 700. Note that the ejector rod position sensor for detecting the position of the ejector rod 210 and the ejector rod moving speed sensor for detecting the moving speed of the ejector rod 210 are by no means limited to an ejector motor encoder, and more general ones can be used.

(Injection Device)

In the following description of the injection device 300 (an example of a plasticizing device), unlike the description of the clamping device 100 and the description of the ejector device 200, the direction in which the screw 330 moves during filling (for example, the negative X-axis direction) will be assumed as front, and the direction in which the screw 330 moves during measurement (for example, the positive X-axis direction) will be assumed as rear.

The injection device 300 is installed on a sliding base 301, and the sliding base 301 is arranged so that it can move forward and backward with respect to the injection device frame 920. The injection device 300 is arranged so that it can move forward and backward with respect to the mold device 800. The injection device 300 touches the mold device 800, and fills the cavity space 801 in the mold device 800 with the molding material measured in the cylinder 310. The injection device 300 includes, for example: a cylinder 310 that heats the molding material; a nozzle 320 provided in a front-end part of the cylinder 310; a screw 330 arranged so as to be free to move forward and backward and free to rotate in the cylinder 310; a measurement motor 340 that rotates the screw 330; an injection motor 350 that moves the screw 330 forward and backward; and a load sensor 360 that detects the load transmitted between the injection motor 350 and the screw 330.

The cylinder 310 heats the molding material supplied therein from a supply port 311. The molding material includes, for example, resins. The molding material is formed, for example, in pellets, and supplied to the supply port 311 in a solid state. The supply port 311 is formed in a rear part with respect to the cylinder 310. A cooler 312 such as a water-cooled cylinder is provided in the outer circumference of the rear part of the cylinder 310. Ahead of the cooler 312, heaters 313 such as band heaters and temperature sensors 314 are provided in the outer circumference of the cylinder 310.

The cylinder 310 is divided into a plurality of zones in the axial direction of the cylinder 310 (for example, the X-axis direction). A heater 313 (an example of a heating part) and a temperature sensor 314 (an example of a detection part) are provided in each zone. In each zone, a set temperature is provided, and the control device 700 controls the heater 313 such that the temperature detected by the temperature sensor 314 matches the set temperature.

The nozzle 320 is provided in the front-end part of the cylinder 310 and pressed against the mold device 800. A heater 313 and a temperature sensor 314 are provided in the outer circumference of the nozzle 320. The control device 700 controls the heater 313 such that the detected temperature of the nozzle 320 matches the set temperature.

The screw 330 is provided in the cylinder 310 such that the screw 330 is free to rotate and free to move forward and backward. When the screw 330 rotates, the molding material is sent forward following the spiral threads of the screw 330. The molding material, while being sent forward, is melted gradually by the heat from the cylinder 310. As the liquid molding material is sent in front of the screw 330 and accumulated in front of the cylinder 310, the screw 330 moves backward. Subsequently, when the screw 330 moves forward, the liquid molding material accumulated in front of the screw 330 is injected from the nozzle 320 and fills the inside of the mold device 800.

A backflow preventing ring 331 is attached to the front part of the screw 330 such that the backflow preventing ring 331 is free to move forward and backward. The backflow preventing ring 331 serves as a backflow preventing valve for preventing the backflow of the molding material when the screw 330 is pushed forward and the molding material is sent from the front to the rear.

When the screw 330 moves forward, the backflow preventing ring 331 is pushed backward by the pressure of the molding material that is located in front of the screw 330, and moves backward relative to the screw 330, to a blocking position (see FIG. 2) where the backflow preventing ring 331 blocks the channel of the molding material. By this means, the molding material accumulated in front of the screw 330 is prevented from flowing backward.

Meanwhile, when the screw 330 rotates, the backflow preventing ring 331 is pushed forward by the pressure of the molding material that is sent forward along the spiral threads of the screw 330, and moves forward relative to the screw 330 up to the open position, which is where the channel for the molding material opens up (see FIG. 1). By this means, the molding material is sent to the front side of the screw 330.

The backflow preventing ring 331 may be either a co-rotating type that rotates with the screw 330 or a non-co-rotating type that does not rotate with the screw 330.

Note that the injection device 300 may include a drive source that makes the backflow preventing ring 331 move forward and backward between the open position and the closed position, with respect to the screw 330.

The measurement motor 340 makes the screw 330 rotate. The drive source for rotating the screw 330 is by no means limited to the measurement motor 340, and may be, for example, an oil-pressure pump or the like.

The injection motor 350 makes the screw 330 move forward and backward. Between the injection motor 350 and the screw 330, a motion conversion mechanism for converting the rotational motion of the injection motor 350 into linear motion of the screw 330, and the like is provided. The motion conversion mechanism includes, for example, a screw shaft, and a screw nut that is screwed into the screw shaft. A ball, a roller, or the like may be provided between the screw shaft and the screw nut. The drive source for making the screw 330 move forward and backward is by no means limited to the injection motor 350, and, for example, an oil-pressure cylinder or the like may be used.

The load sensor 360 detects the load that is transmitted between the injection motor 350 and the screw 330. The detected load is converted into pressure in the control device 700. The load sensor 360 is provided on the transmission path of the load between the injection motor 350 and the screw 330, and detects the load that acts on the load sensor 360.

The load sensor 360 sends a signal indicating the detection result to the control device 700. The load detected by the load sensor 360 is converted into pressure that acts between the screw 330 and the molding material, and used to control or monitor the pressure the screw 330 receives from the molding material, the back pressure upon the screw 330, the pressure acting on the molding material from the screw 330, and so forth.

Note that the pressure sensor for detecting the pressure of the molding material is by no means limited to the load sensor 360, and more general ones can be used as well. For example, a nozzle pressure sensor or an inner-mold pressure sensor may be used. The nozzle pressure sensor may be installed in the nozzle 320. The inner-mold pressure sensor may be installed in the mold device 800.

The injection device 300 performs a measurement step, a filling step, a pressure-holding step, and so forth, under the control of the control device 700. The filling step and the pressure-holding step may be also collectively referred to as an "injection step."

In the measurement step, the measurement motor 340 is driven to rotate the screw 330 at a number of rotations per unit time according to the settings, and the molding material is sent forward following the spiral threads of the screw 330. Accompanying this, the molding material melts gradually. As the liquid molding material is sent in front of the screw 330 and accumulated in front of the cylinder 310, the screw 330 moves backward. The number of rotations of the screw 330 per unit time is detected by using, for example, a measurement motor encoder 341. The measurement motor encoder 341 detects the rotation of the measurement motor 340, and sends a signal indicating the detection result to the control device 700. Note that the screw rotation speed sensor for detecting the number of rotations of the screw 330 per unit time is by no means limited to the measurement motor encoder 341, and more general ones can be used as well.

In the measurement step, the injection motor 350 may be driven to apply a back pressure determined by the settings to the screw 330, so as to prevent the screw 330 from moving backward too suddenly. The back pressure upon the screw 330 is detected by using, for example, the load sensor 360. When the screw 330 moves back to the position where the measurement ends and a predetermined amount of molding material is accumulated in front of the screw 330, the measurement step is completed.

The position and number of rotations of the screw 330 per unit time are set together as a series of settings. For example, the position where the measurement is started, the position where the number of rotations per unit time is switched, and the position where the measurement is completed are set. These positions are arrayed in this order from the front to the rear, and represent the starting points and the ending points of sections where the number of rotations per unit time is set. The number of rotations per unit time is set per section. The number of rotations per unit time may be switched at one position or may be switched at a number of positions. The position to switch the number of rotations per unit need not be set. Also, the back pressure is set per section.

In the filling step, the injection motor 350 is driven to move the screw 330 forward at a set moving speed. The cavity space 801 in the mold device 800 is filled with the liquid molding material accumulated in front of the screw 330. The position and moving speed of the screw 330 are detected by using, for example, an injection motor encoder 351. The injection motor encoder 351 detects the rotation of the injection motor 350 and sends a signal indicating the detection result to the control device 700. When the position of the screw 330 reaches a set position, the filling step switches to the pressure-holding step (this switching is commonly referred to as "V/P switchover"). The position where V/P switchover takes place is also referred to as the "V/P switchover position." The set moving speed of the screw 330 may be changed depending on the position of the screw 330, the time, and so forth.

The position and the moving speed of the screw 330 in the filling step are set together as a series of settings. For example, the position where the filling is started (also referred to as "the injection-starting position"), the position to switch the moving speed, and the V/P switchover position are set. These positions are arranged in this order, from the rear to the front, and represent the starting points and ending points of sections where the moving speed is set. The moving speed is set per section. The moving speed may be switched at one position or may be switched at a number of positions. The position to switch the moving speed need not be set.

In every section in which the moving speed of the screw 330 is set, the upper limit value of pressure for the screw 330 is set. The pressure of the screw 330 is detected by the load sensor 360. When the pressure of the screw 330 is less than or equal to a set pressure, the screw 330 is moved forward at the set moving speed. On the other hand, when the pressure of the screw 330 is greater than the set pressure, the screw 330 is moved forward at a moving speed slower than the set moving speed, such that the pressure of the screw 330 becomes less than or equal to the set pressure, in order to protect the mold.

Note that, when the position of the screw 330 arrives at the V/P switchover position during the filling step, the screw 330 may be temporarily stopped at the V/P switchover position, and V/P switchover may be carried out later. Shortly before the V/P switchover, the screw 330 may be moved forward or backward at a low speed, instead of stopping. Also, as for the screw position sensor for detecting the position of the screw 330 and the screw moving speed sensor for detecting the moving speed of the screw 330, these are by no means limited to the injection motor encoder 351, and more general ones can be used.

In the pressure-holding step, the injection motor 350 is driven to push the screw 330 forward, the pressure on the molding material in the front-end part of the screw 330 (hereinafter also referred to as the "holding pressure") is kept at a set pressure, and the molding material that remains in the cylinder 310 is pushed toward the mold device 800. By this means, the shortage of the molding material due to cooling-induced contraction inside the mold device 800 can be replenished. The holding pressure is detected by using, for example, the load sensor 360. The set value of the holding pressure may be changed in accordance with the time elapsed since the start of the pressure-holding step, and so forth. The holding pressure and the time to keep the holding pressure in the pressure-holding step may be set multiple in number, and may be set together as a series of settings.

In the pressure-holding step, the molding material in the cavity space 801 in the mold device 800 gradually cools down, and, when the pressure-holding step is completed, the inlet of the cavity space 801 is sealed with the solidified molding material. This state is referred to as "gate seal," and the backflow of the molding material from the cavity space 801 is prevented therewith. After the pressure-holding step, the cooling step is started. In the cooling step, the molding material in the cavity space 801 is solidified. The measurement step may be performed during the cooling step, so as to reduce the time cycle of molding.

Note that, although the injection device 300 of this embodiment employs an in-line screw method, a pre-plunger method or the like may be employed as well. The pre-plunger-type injection device supplies the molding material melted in a plasticized cylinder, to an injection cylinder, and injects the molding material from the injection cylinder into the mold device. A screw is provided in the plasticized cylinder so as to be free to rotate, or free to rotate while moving forward and backward. Meanwhile, a plunger is provided inside the injection cylinder, free to move forward and backward.

Also, although the injection device 300 of this embodiment is a horizontal type in which the axial direction of the cylinder 310 is horizontal, the injection device 300 may be a vertical type in which the axial direction of the cylinder 310 is vertical. The clamping device to be combined with a vertical injection device 300 may be vertical or horizontal. Similarly, the clamping device to be combined with a horizontal injection device 300 may be horizontal or vertical.

(Move Device)

In the description of the move device 400, as in the above description of the injection device 300, the direction in which the screw 330 moves during filling (for example, the negative X-axis direction) is the front, and the direction in which the screw 330 moves during measurement (for example, the positive X-axis direction) is the rear.

The move device 400 allows the injection device 300 to move forward and backward with respect to the mold device 800. Also, the move device 400 presses the nozzle 320 against the mold device 800 to generate a nozzle touch pressure. The move device 400 includes: a liquid-pressure pump 410; a motor 420 to serve as a drive source; a liquid-pressure cylinder 430 to serve as a liquid-pressure actuator; and so forth.

The liquid-pressure pump 410 has a first port 411 and a second port 412. The liquid-pressure pump 410 is a pump that can rotate in both directions, and, by switching the direction of rotation of the motor 420, the liquid-pressure pump 410 sucks in the hydraulic fluid (for example, oil) from one of the first port 411 and the second port 412 and discharges it from the other one, thereby generating a hydraulic pressure. The liquid-pressure pump 410 can also suck in the hydraulic fluid from a tank and discharge it from one of the first port 411 and the second port 412.

The motor 420 makes the liquid-pressure pump 410 operate. The motor 420 drives the liquid-pressure pump 410 in the direction of rotation, and with rotational torque, in accordance with control signals from the control device 700. The motor 420 may be an electric motor or an electric servo motor.

The liquid-pressure cylinder 430 includes a cylinder body 431, a piston 432, and a piston rod 433. The cylinder body 431 is fixed to the injection device 300. The piston 432 divides the inside of the cylinder body 431 into a front chamber 435 that serves as a first chamber, and a rear chamber 436 that serves as a second chamber. The piston rod 433 is fixed to the fixed platen 110.

The front chamber 435 of the liquid-pressure cylinder 430 is connected with the first port 411 of the liquid-pressure pump 410 via a first channel 401. The hydraulic fluid discharged from the first port 411 is supplied to the front chamber 435 via the first channel 401, pushing the injection device 300 forward. As the injection device 300 moves forward, the nozzle 320 is pressed against the fixed mold 810. The front chamber 435 functions as a pressure chamber that generates a nozzle touch pressure of the nozzle 320 by using the pressure of the hydraulic fluid supplied from the liquid-pressure pump 410.

Meanwhile, the rear chamber 436 of the liquid-pressure cylinder 430 is connected with the second port 412 of the liquid-pressure pump 410 via a second channel 402. The hydraulic fluid discharged from the second port 412 is supplied to the rear chamber 436 of the liquid-pressure cylinder 430 via the second channel 402, pushing the injection device 300 backward. As the injection device 300 moves backward, the nozzle 320 is separated from the fixed mold 810.

Note that, although the move device 400 according to the present embodiment includes the liquid-pressure cylinder 430, the present invention is by no means limited to this. For example, it is possible to use an electric motor and a motion conversion mechanism that converts the rotational motion of the electric motor into linear motion of the injection device 300, instead of using the liquid-pressure cylinder 430.

(Control Device)

The control device 700 is composed of a computer, and, as shown in FIG. 1 and FIG. 2, includes: a CPU (Central Processing Unit) 701; a memory medium 702 such as a memory; an input interface 703; and an output interface 704. The control device 700 causes the CPU 701 to execute programs stored in the memory medium 702, and performs various controls. Also, the control device 700 receives signals from the outside via the input interface 703, and sends signals to the outside via the output interface 704.

The control device 700 repeats the measurement step, the mold-closing step, the pressurizing step, the clamping step, the filling step, the pressure-holding step, the cooling step, the depressurizing step, the mold-opening step, the ejection step, and so forth, thereby repeatedly manufacturing the molded product. The series of operations for having a molded product is also referred to as a "shot" or a "molding cycle." This includes, for example, the operation from the start of the measurement step, up to the start of the next measurement step. Also, the time required for one shot is also referred to as a "molding cycle time" or a "cycle time."

One molding cycle is composed of, for example, a measurement step, a mold-closing step, a pressurizing step, a clamping step, a filling step, a pressure-holding step, a cooling step, a depressurizing step, a mold-opening step, and an ejection step, performed in this order. This order is the order of starting each step. The filling step, the pressure-holding step, and the cooling step are performed during the clamping step. The start of the clamping step may match the start of the filling step. Also, the end of the depressurizing step may match the start of the mold-opening step.

Note that multiple steps may be performed simultaneously in order to shorten the molding cycle time. For example, the measurement step may be performed during the cooling step in the previous molding cycle, or during the clamping step. In this case, the mold-closing step may be performed at the beginning of the molding cycle. Also, the filling step may be started during the mold-closing step. The ejection step may be started during the mold-opening step. When an on-off valve for opening and closing the channel of the nozzle 320 is provided, the mold-opening step may be started during the measurement step. This is because, even if the mold-opening step is started during the measurement step, the molding material does not leak from the nozzle 320 as long as the channel of the nozzle 320 is closed by the on-off valve.

Note that one molding cycle may include steps other than the measurement step, the mold-closing step, the pressurizing step, the clamping step, the filling step, the pressure-holding step, the cooling step, the depressurizing step, the mold-opening step, and the ejection step.

For example, after completing the pressure-holding step and before starting the measurement step, a pre-measurement suck-back step may be performed, in which the screw 330 is moved backward to a pre-configured measurement starting position. In this case, the pressure of the molding material accumulated in front of the screw 330 can be reduced before the measurement step is started, so that the screw 330 can be prevented from moving backward too suddenly at the start of the measurement step.

Also, after completing the measurement step and before starting the filling step, a post-measurement suck-back step may be performed, in which the screw 330 is moved backward to a pre-configured filling starting position (also referred to as the "injection starting position"). In this case, the pressure of the molding material accumulated in front of the screw 330 can be reduced before the filling step is started, so that the molding material is prevented from leaking from the nozzle 320 before the filling step is started.

The control device 700 is connected to an operating device 750 that receives the user's input operations, and a display device 760 that displays a screen. The operating device 750 and the display device 760 may be set with a touch panel 770, for example, and may be integrated with the touch panel 770. The touch panel 770, when serving as a display device 760, displays a screen under the control of the control device 700. The screen of the touch panel 770 may display information such as, for example, the settings of the injection molding machine 10, the current state of the injection molding machine 10, and so forth. Also, on the screen of the touch panel 770, for example, operating parts such as buttons for receiving the user's input operations, input fields, and the like may be displayed. The touch panel 770, when serving as an operating device 750, detects the user's input operations on the screen, and outputs signals corresponding to the input operations to the control device 700. By this means, for example, the user can check the information displayed on the screen, and operate the operating parts displayed on the screen to, for example, set up the injection molding machine 10 (including inputting values for the settings). Also, since the user operates the operating parts provided on the screen, the injection molding machine 10 is able to operate in accordance with the operating parts. Note that the operations of the injection molding machine 10 may include, for example, the operations (including a stop) of the clamping device 100, the ejector device 200, the injection device 300, the move device 400, and so forth. Also, the operations of the injection molding machine 10 may include, for example, switching of the screen displayed on the touch panel 770 serving as the display device 760.

Note that, although the operating device 750 and the display device 760 of the present embodiment are described as integrated in a touch panel 770, they may be provided separately as well. Also, multiple operating devices 750 may be provided. The operating device 750 and the display device 760 are positioned on the operating side (the negative Y-axis direction) of the clamping device 100 (to be more specific, the fixed platen 110).

First Embodiment

Figure 3:
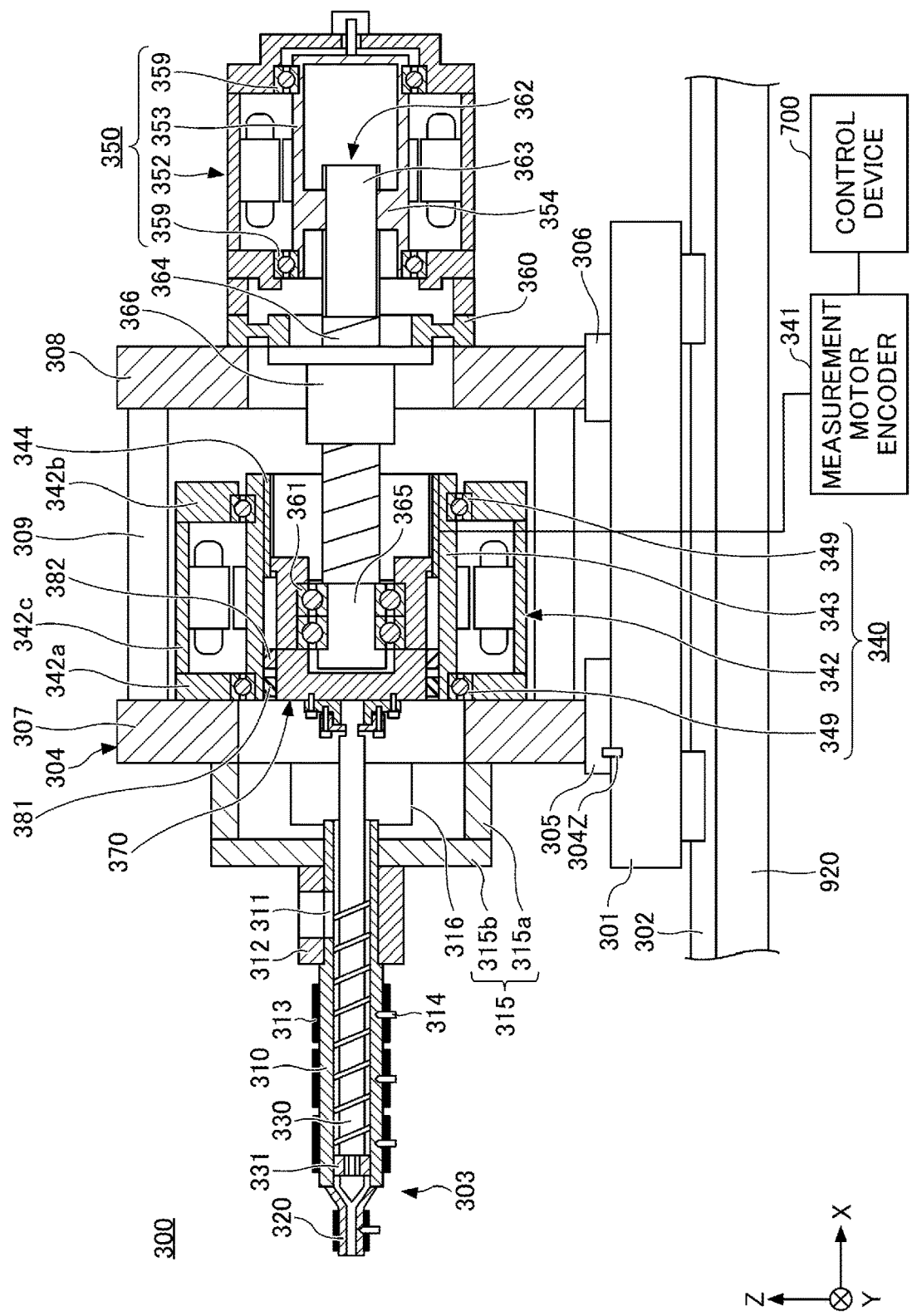
FIG. 3 is a diagram showing a configuration around an injection device according to a first embodiment.

FIG. 3 is a diagram showing a configuration around the injection device 300 according to the first embodiment.

Figure 4:
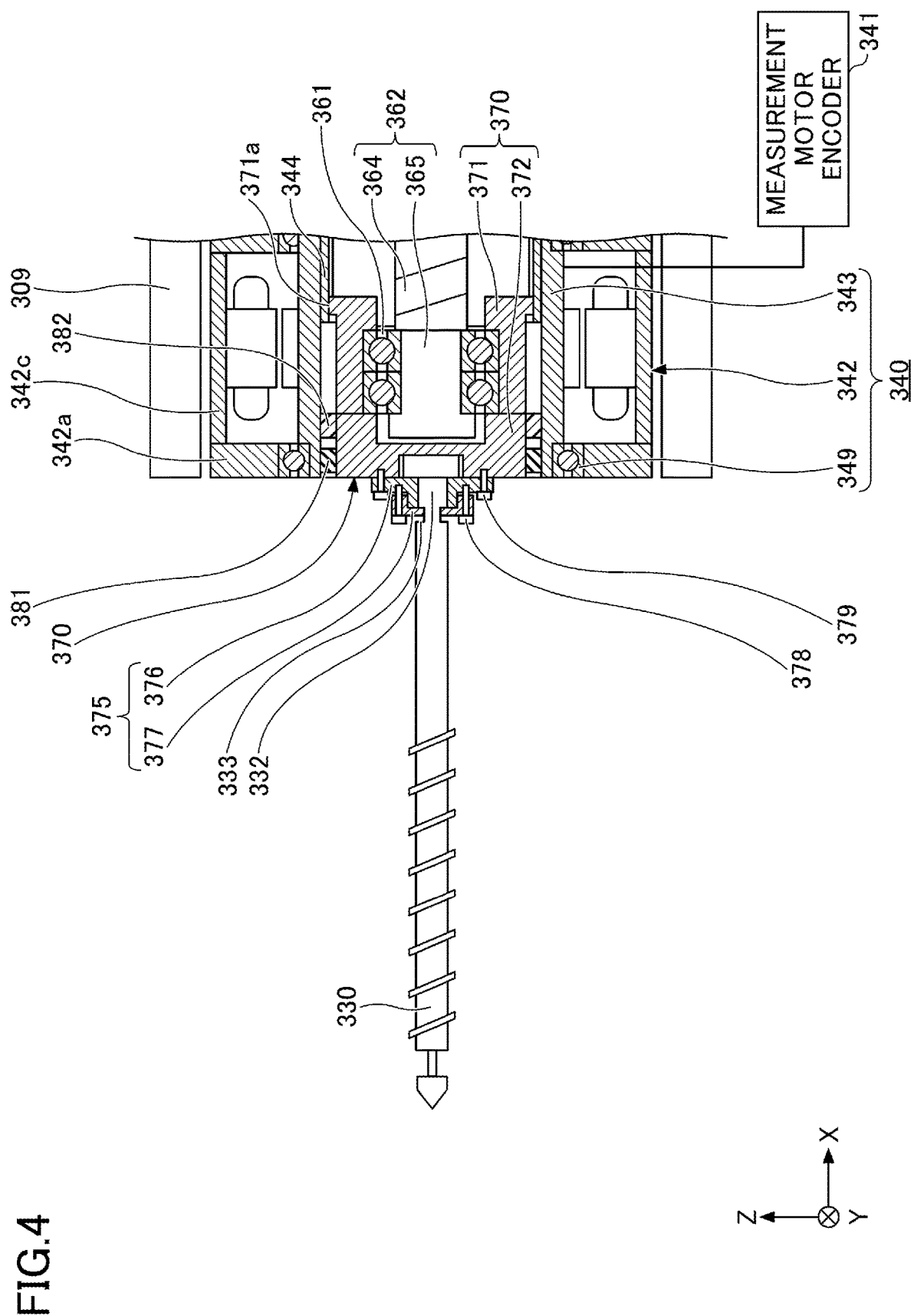
FIG. 4 is a partially-enlarged view of the vicinity of the injection device after removing an assembly including a nozzle and a cylinder from the injection device of FIG. 3.

FIG. 4 is a partially-enlarged view of the vicinity of the injection device 300 after the assembly including the nozzle 320 and the cylinder 310 is removed from the injection device 300 of FIG. 3.

Since the nozzle 320 and the cylinder 310 are adjusted to the diameter of the cylinder 310, when the diameter of the cylinder 310 is changed, the nozzle 320 and the cylinder 310 also need to be removed. So, in the example shown in FIG. 4, the nozzle 320 and the cylinder 310 are removed.

The injection device 300 includes an injection device body 303, and a support frame 304 that supports the injection device body 303. The injection device body 303 includes, for example, a cylinder 310, a nozzle 320, a screw 330, a measurement motor 340, an injection motor 350, and a load sensor 360. The injection device body 303 further includes: a bearing 361 that supports the screw 330 in a rotatable fashion; a drive shaft 362 that moves forward and backward while being rotated by the injection motor 350; and a bearing holder 370 that supports the drive shaft 362 via the bearing 361 in a rotatable fashion.

A support frame 304 is installed on the sliding base 301. The sliding base 301 moves forward and backward along two guides 302 (only one is shown in FIG. 3). The two guides 302 are laid on the injection device frame 920. The two guides 302 both extend in the X-axis direction. The two guides 302 are spaced apart in the Y-axis direction. The support frame 304 is installed on the sliding base 301 such that the support frame 304 can rotate about a vertical rotating shaft 304Z. The injection device body 303 can be rotated together with the support frame 304.

The support frame 304 has a front rotating plate 305 and a rear rotating plate 306. The front rotating plate 305 and the rear rotating plate 306 are mounted on the upper surface of the sliding base 301 in a slidable fashion. The rotating shaft 304Z is arranged at a predetermined position where the front rotating plate 305 is. The rear rotating plate 306 is arranged behind the front rotating plate 305.

The support frame 304 has a front flange 307, a rear flange 308, and a plurality of joint rods 309. The front flange 307 is attached to the front rotating plate 305. The rear flange 308 is attached to the rear rotating plate 306. The joint rods 309 join together the front flange 307 and the rear flange 308 with a space therebetween.

The cylinder 310 and the measurement motor 340 are attached to the front flange 307. The cylinder 310 is arranged in front of the front flange 307, and attached to the front flange 307 via a cylindrical body 315. The measurement motor 340 is arranged in a position behind the front flange 307 and in front of the rear flange 308.

On the other hand, the injection motor 350 is attached to the rear flange 308. The injection motor 350 is arranged behind the rear flange 308, and attached to the rear flange 308 via a load sensor 360, which will be described later.

The measurement motor 340 rotates the screw 330. The measurement motor 340 includes: a stator 342 fixed to the front flange 307; a rotor 343 that rotates inside the stator 342; and a bearing 349 that supports the rotor 343 in a rotatable fashion. The stator 342 includes: a front flange 342a that holds the bearing 349; a rear flange 342b that holds the bearing 349; a housing 342c that connects the front flange 342a and the rear flange 342b. The rotating motion of the measurement motor 340 is transmitted to the bearing holder 370, and furthermore transmitted from the bearing holder 370 to the screw 330.

The bearing holder 370 includes: a screw attaching part 372, to which the screw 330 is attached; and a measurement spline shaft 371, with which the rotor 343 of the measurement motor 340 is connected by spline coupling. The measurement spline shaft 371 is arranged inside the rotor 343 of the measurement motor 340. The rotor 343 is provided with a measurement spline nut 344.

The measurement spline nut 344 has, on its inner surface, a plurality of key grooves that are circumferentially arranged at equal intervals. On the other hand, the measurement spline shaft 371 has, on its outer surface, a plurality of keys that are circumferentially arranged at equal intervals. The measurement spline shaft 371 and the measurement spline nut 344 are connected by spline coupling. Note that the number of key grooves and the number of keys may be each one.

The injection motor 350 allows the screw 330 to move forward and backward. The injection motor 350 includes: a stator 352 that is fixed to the rear flange 308 via the load sensor 360; a rotor 353 that rotates inside the stator 352; and a bearing 359 that supports the rotor 353 in a rotatable fashion. The rotating motion of the injection motor 350 is converted into rotating linear motion of the drive shaft 362, and further converted into linear motion of the bearing holder 370. As the bearing holder 370 moves forward and backward, the screw 330 moves forward and backward.

The drive shaft 362 has an injection spline shaft 363, a screw shaft 364, and a rotating shaft 365 from the rear to the front, in this order, on the same straight line.

The injection spline shaft 363 is arranged inside the rotor 353 of the injection motor 350. The rotor 353 is provided with an injection spline nut 354. The injection spline nut 354 has, on its inner surface, a plurality of key grooves that are circumferentially arranged at equal intervals. On the other hand, the injection spline shaft 363 has, on its outer surface, a plurality of keys arranged circumferentially at equal intervals. The injection spline shaft 363 and the injection spline nut 354 are connected by spline coupling. Note that the number of key grooves and the number of keys may be each one.

The screw shaft 364 is screwed with a screw nut 366. A ball or a roller may be interposed between the screw shaft 364 and the screw nut 366. The screw nut 366 is fixed to the rear flange 308 via the load sensor 360, and therefore does not rotate with the screw shaft 364. Consequently, the screw shaft 364 rotates while moving forward and backward. The injection spline shaft 363 and the injection spline nut 354 are connected by spline coupling so as to allow the screw shaft 364 to rotate while moving forward and backward.

The rotating shaft 365 is held by the bearing holder 370 via the bearing 361. The bearing holder 370 has a cylindrical measurement spline shaft 371, and the bearing 361 is fixed to the inner surface of the measurement spline shaft 371. The bearing 361 has an inner ring that rotates with the rotating shaft 365 and an outer ring that is fixed to the measurement spline shaft 371. The bearing 361 prevents rotational driving force from transmitting from the rotating shaft 365 to the bearing holder 370.

As the rotating shaft 365 rotates while moving forward and backward, the bearing holder 370 moves forward and backward, and the screw 330 moves forward and backward. When the screw 330 moves forward and backward, the measurement motor 340 does not move forward or backward. This is because the measurement spline nut 344 of the measurement motor 340 and the measurement spline shaft 371 of the bearing holder 370 are connected by spline coupling. The measurement motor 340 is not driven by the injection motor 350, and therefore the inertia of the object to be driven by the injection motor 350 is low, and the acceleration when the screw 330 starts moving forward is high.

Note that the structure of the injection device 300 is not limited to the structure shown in FIG. 3. For example, the arrangement of the drive source (for example, the measurement motor 340 and the injection motor 350) for driving the screw 330 is not limited to the arrangement shown in FIG. 3. To be more specific, although, according to the present embodiment, the rotational centerline of the screw 330, the rotational centerline of the measurement motor 340, and the rotational centerline of the injection motor 350 are arranged on the same straight line, these centerlines do not have to be arranged on the same straight line.

Also, the structure of the transmission mechanism that transmits the driving force of the drive source to the screw 330 is not limited to the structure shown in FIG. 3. The structure of the transmission mechanism is changed as appropriate according to the arrangement of the drive source that drives the screw 330. For example, when the rotational centerlines of the measurement motor 340 and the screw 330, which are parallel to each other, are shifted and arranged in a direction orthogonal to these rotational centerlines, a timing belt may be used. Similarly, when the rotational centerlines of the injection motor 350 and the screw 330, which are parallel to each other, are shifted and arranged in a direction orthogonal to these rotational centerlines, a timing belt may be used as well.

A coupling 375 connects the screw 330 and the bearing holder 370. The coupling 375 includes: a spline nut 376, with which the spline shaft 332 formed in the rear end part of the screw 330 is connected by spline coupling; and a flange 377, which presses the spline shaft 332 from the front. The flange 377 fits in a groove 333 of the screw 330. The groove 333 is formed in front of the spline shaft 332. The flange 377 is divided into two arc-shaped split bodies, which fit in the groove 333 and press the spline shaft 332 from the front.

The flange 377 is fastened to the spline nut 376 by a first bolt 378. The spline nut 376 is fastened to the bearing holder 370 by a second bolt 379, and presses the load sensor 360 from the front. The operation of fastening and loosening the first bolt 378 and the second bolt 379 is performed through a window 316 of the cylindrical body 315, arranged between the front flange 307 and the cooler 312.

The cylindrical body 315 includes: a cylinder part 315a that protrudes forward from the front flange 307; and an inner flange part 315b that protrudes toward the inside of the cylinder part 315a, from the front-end surface of the cylinder part 315a. The window 316 is formed in the cylinder part 315a. The outer edge of the cylinder 310 is fixed to the inner edge of the inner flange part 315b.

An annular groove for fitting the annular packing 381 and an annular groove for fitting the sliding ring 382 are formed in the outer surface of the bearing holder 370.

The annular packing 381 is held by, for example, the bearing holder 370, contacts the rotor 343 of the measurement motor 340 in a slidable fashion, and seals the gap between the rotor 343 and the bearing holder 370. By this means, it is possible to prevent the lubricant supplied to the measurement spline shaft 371 from leaking to the screw 330 side.

The annular packing 381 may be attached at a position in front of the key 371a of the measurement spline shaft 371. The annular packing 381 may be attached to the measurement spline shaft 371, but may alternatively be attached to the screw attaching part 372 as shown in FIG. 3 and FIG. 4.

For the annular packing 381, for example, an O-ring having a round cross-sectional shape is used, and is compressed appropriately when used. The annular packing 381 is made of a softer material than the sliding ring 382 in order to ensure its sealing performance. The materials of the annular packing 381 may be rubber such as butyl rubber.

Note that, although the annular packing 381 is held in the bearing holder 370 in the present embodiment, the annular packing 381 may also be held in the rotor 343 of the measurement motor 340, contact the bearing holder 370 in a slidable fashion, and seal the gap between the rotor 343 and the screw attaching part 372.

The sliding ring 382 is held by, for example, the screw attaching part 372, contacts the rotor 343 of the measurement motor 340 in a slidable fashion, and align the centerline of the rotor 343 with the centerline of the screw attaching part 372. By this means, it is possible to prevent galling between the rotor 343 and the screw attaching part 372. Also, it is possible to prevent unbalanced load from applying to the annular packing 381.

The sliding ring 382 is made of a harder material than the annular packing 381 in order to reduce the eccentricity between the rotor 343 and the screw attaching part 372. For the material for the sliding ring 382, a crystalline resin or the like having excellent self-lubricating properties is used. The crystalline resin may be, for example, polytetrafluoroethylene (PTFE), polyamide (PA), polyesters (PES), polyethylene (PE), and the like. The greater the degree of crystallinity, the better the self-lubricating properties. The sliding ring 382 may be made of a resin other than the crystalline resin, and may be made of, for example, a fabric-filled phenolic resin.

Unlike the annular packing 381, the sliding ring 382 is not meant to ensure its sealing performance, and so it has a cut partly in the circumferential direction. The cut is formed for removal and attachment of the sliding ring 382, widened upon removal and attachment of the sliding ring 382, and resumes its original state by the elastic restoring force of the sliding ring 382.

Note that, although the sliding ring 382 is held by the screw attaching part 372 in the present embodiment, the sliding ring 382 may be held by the rotor 343 of the measurement motor 340, contact the screw attaching part 372 in a slidable fashion, and align the centerline of the rotor 343 with the centerline of the screw attaching part 372. Also, multiple sliding rings 382 may be provided.

As shown in FIG. 3, the sliding ring 382 and the annular packing 381 are disposed in this order, from the key 371a side (the rear side) of the measurement spline shaft 371, toward the screw 330 side (the front side). The annular packing 381 prevents the lubricant supplied to the measurement spline shaft 371 and passed through the sliding ring 382 from leaking to the screw 330 side. By supplying the lubricant to the sliding ring 382, the sliding resistance of the sliding ring 382 can be reduced, and, furthermore, leakage of the lubricant to the screw 330 side can be prevented. Here, the lubricant supplied to the measurement spline shaft 371 passes between the sliding ring 382 and the rotor 343 of the measurement motor 340, passes between the sliding ring 382 and the screw attaching part 372, passes through the gap formed in the sliding ring 382, and so forth.

The injection molding machine 10 has a load sensor 360. The load sensor 360 detects the load transmitted between the injection motor 350 and the screw 330. The load sensor 360 detects load behind the bearing 361. The load sensor 360 is, for example, a washer type that is arranged between the rear flange 308 and the injection motor 350.

The measurement motor encoder 341 detects the rotation speed of the measurement motor 340 as well as the rotation position of the measurement motor 340. For example, the measurement motor encoder 341 performs a measurement with respect to the rotor 343 of the measurement motor 340. Then, the measurement motor encoder 341 detects the rotation position of the measurement motor 340 based on the measurement result, and sends a signal indicating the detection result, to the control device 700.

Also, the measurement motor encoder 341 may store therein a small battery, a readable and writable memory medium, and the like. By this means, even while the injection molding machine 10 is powered off, the measurement motor encoder 341 can measure the rotation speed and rotation position of the measurement motor 340, and store the measurement results in the memory medium.

Figure 5:
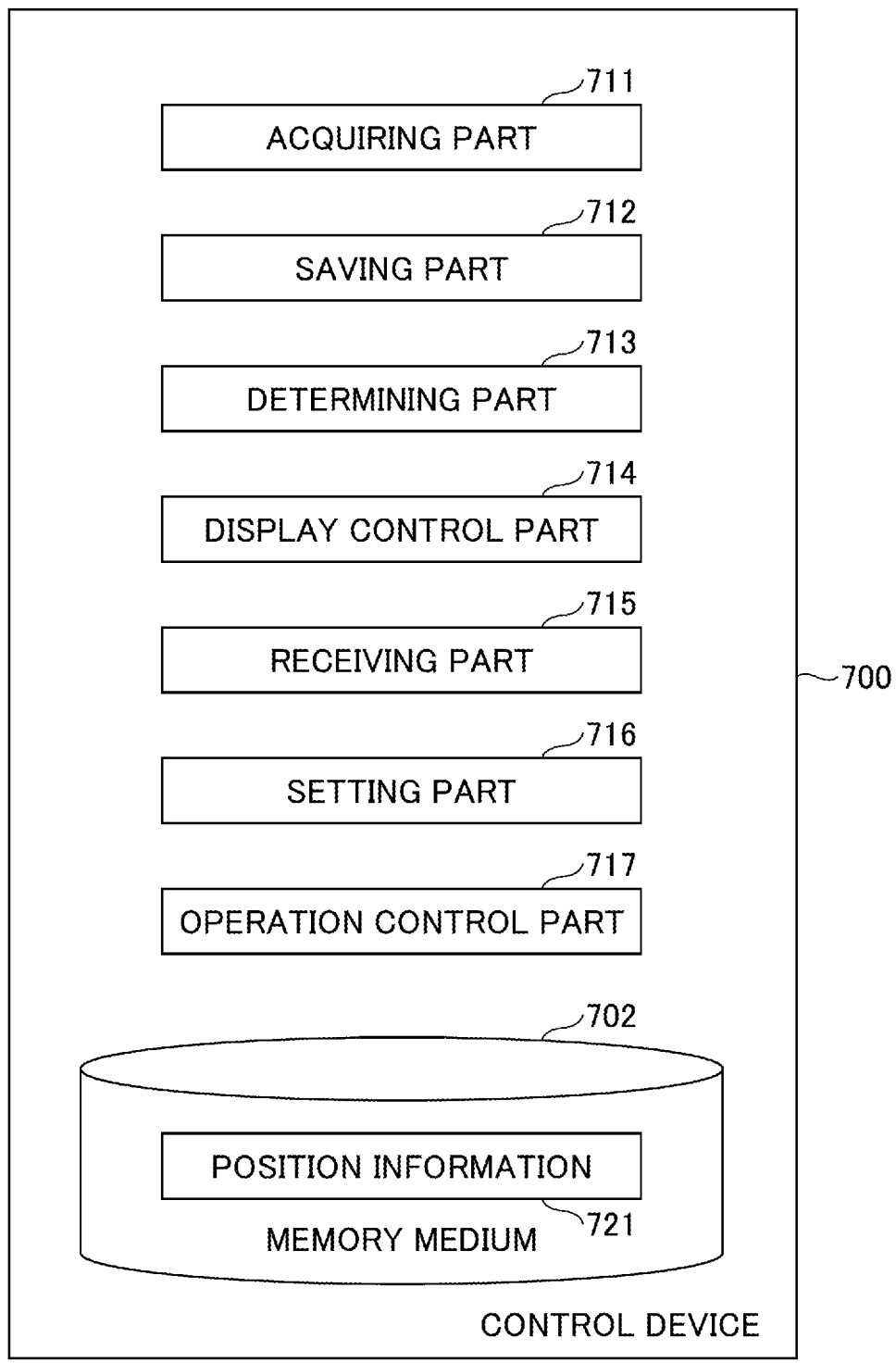
FIG. 5 is a diagram showing the components of the control device according to the first embodiment in functional blocks.

FIG. 5 is a diagram showing components of the control device 700 according to the present embodiment in functional blocks. Note that the functional blocks shown in FIG. 5 are simply conceptual, and do not necessarily have to be physically configured as illustrated. All or part of the functional blocks can be functionally or physically distributed or integrated in various units and patterns. All or part of the processing functions performed by each functional block are implemented by programs executed by the CPU 701. Alternatively, each functional block may be implemented as hardware by wired logic. As shown in FIG. 5, the control device 700 has an acquiring part 711, a saving part 712, a determining part 713, a display control part 714, a receiving part 715, a setting part 716, and an operation control part 717. Also, the memory medium 702 (an example of a memory part) is provided with an area for storing position information 721. Note that detailed description of each component will be provided later.

Now, with the injection molding machine 10, changing the diameter of the screw 330 requires physically removing or attaching the assembly including the screw 330. With the injection molding machine 10, when the diameter of the screw 330 is changed, control is executed using parameters corresponding to that diameter of the screw 330.

Consequently, when the diameter of the screw 330 is changed, it is necessary to reconfigure the settings in accordance with that diameter of the screw 330. So, with the present embodiment, the control device 700 automatically determines whether or not the diameter of the screw 330 has changed. Then, when the control device 700 determines that the diameter of the screw 330 has changed, a message for checking the screw's diameter is displayed on the operation screen of the display device 760. By this means, the worker is prompted to enter information about the diameter of the screw 330.

Furthermore, when the control device 700 determines that the diameter of the screw 330 has changed, in addition to displaying the above message on the operation screen, the control device 700 interlocks the operations of the plasticizing device. The operations of the plasticizing device are limited until information about the diameter of the screw 330 is received as input from the worker. By this means, the control device 700 can prevent operations based on wrong parameters.

The plasticizing device is a component for allowing driving operations, such as the rotational plasticization of the screw 330, by transmitting the rotation of the measurement motor 340 and the injection motor 350 to the screw 330, and includes at least the injection device 300.

The operations of the plasticizing device include, for example, producing molded products (injection operation), discharging (purging) resin, and so forth.

Next, the operations of the injection molding machine 10 will be described below.

In the memory medium 702, an area for storing position information 721 is provided. The position information 721 indicates the rotation position of the screw 330 detected by the measurement motor encoder 341. The timing for writing and reading the position information 721 will be described later.

The acquiring part 711 acquires various information from various sensors provided in the injection molding machine 10. For example, the acquiring part 711 acquires the rotation speed of the measurement motor 340 and the rotation position of the measurement motor 340 from the measurement motor encoder 341 as measurement results.

At the timing the control of the measurement motor 340 of the injection molding machine 10 is stopped, the saving part 712 saves the rotation position (hereinafter referred to as "the first encoder position") of the measurement motor 340 in the memory medium 702 as position information 721.

The timing to stop the control of the measurement motor 340 according to the present embodiment is, for example, the timing to power off the whole injection molding machine 10, the timing to turn off the supply of power to the measurement motor 340 while the power of the whole injection molding machine 10 remains on, and so forth.

As for the timing the supply of power to the measurement motor 340 is turned off while the power of the whole injection molding machine 10 remains on, this may be, for example, the timing at which the door of the safety device is opened in order to take out the molded product (not shown) while power is being supplied to the control device 700.

In other words, the saving part 712 saves the first encoder position of the measurement motor 340 in the memory medium 702 as position information 721, before the time period in which the control of the measurement motor 340 is stopped and the screw 330 can be removed or attached. By this means, when the control of the measurement motor 340 is started, it is possible to determine whether or not the rotation position of the measurement motor 340 has changed.

The determining part 713 determines whether or not an operation of removing or attaching the screw 330, which rotates in accordance with the measurement motor 340, has been performed, based on the encoder position of the measurement motor 340 that is provided in the injection molding machine 10. Note that, although an example of determining whether or not an operation of removing or attaching the screw 330 (hereinafter also referred to as the "removing or attaching operation of the screw 330," and the like) has been performed is described with the present embodiment, the present embodiment by no means makes the operation of removing or attaching the screw 330 a limitation, only insofar as the operation of removing or attaching the screw 330 is subject to determination).

To be more specific, when the control of the measurement motor 340 is started, the determining part 713 determines whether or not the difference between the rotation position of the measurement motor 340 acquired by the acquiring part 711 (hereinafter referred to as the "second encoder position") and the first encoder position stored in the position information 721 of the memory medium 702 is greater than or equal to a predetermined value. The predetermined value is a value that is determined in accordance with the embodiment, and is a value that is determined in accordance with the amount of rotation, by which the measurement motor 340 is estimated to move, based on the removing or attaching operation of the screw 330. Then, when the determining part 713 determines that the difference between the second encoder position and the first encoder position is equal to or greater than the predetermined value, the determining part 713 determines that the diameter of the screw 330 has changed, or that, in other words, the screw 330 has been removed or attached. Next, the removing or attaching operation of the screw 330 will be described.

As shown in FIG. 4, the measurement motor 340 and the screw 330 of the injection molding machine 10 are fastened via the coupling 375 or the like. To remove the screw 330, the coupling 375 must be removed from the bearing holder 370. It then follows that the operation of removing or attaching the assembly including the screw 330 entails removing the first bolt 378 and the second bolt 379 that fasten the coupling 375 to the bearing holder 370. When removing the first bolt 378 and the second bolt 379, the worker needs to use a tool to rotate the first bolt 378 and the second bolt 379 in the loosening direction.

During this operation, the supply of power to the measurement motor 340 is turned off to ensure the worker's safety. Consequently, while the worker performs the operation of removing or attaching the assembly including the screw 330, the configuration including the measurement motor 340 rotates via the bearing holder 370, due to the external force caused by that operation.

Therefore, the above-described method of making a determination may be used when the control of the measurement motor 340 is started, or, in other words, at the timing the supply of power to the measurement motor 340 is turned on, so that the determining part 713 can determine whether or not the operation of removing or attaching the screw 330 that rotates in accordance with the measurement motor 340 has been performed.

Note that the present embodiment only shows an example of a method for determining whether or not the operation of removing or attaching the screw 330 has been performed, and other determination methods may be used as well. For example, while the injection molding machine 10 is powered off and the operation of removing or attaching the screw 330 is performed, the measurement motor encoder 341, if run by an internal battery or the like, can detect changes in the rotation speed, the rotation position, and so forth. In this case, between the time the control of the measurement motor 340 is stopped and the time the control is started, the determining part 713 can determine whether or not the operation of removing or attaching the screw 330 has been performed, based on changes in the rotation speed and rotation position of the measurement motor 340 detected by the measurement motor encoder 341. In other words, the information that the determining part 713 uses to make the determination may be information that is detected in accordance with the movement of the measurement motor 340 during the operation of removing or attaching the screw 330.

For the operation of removing or attaching the screw 330 according to the present embodiment, a case of replacing a set of assemblies including the screw 330 in order to change the diameter of the screw 330 will be described below. However, the present embodiment by no means limits the operation of removing or attaching the screw 330 to the case of changing the diameter of the screw 330. For example, when changing at least one of the shape and the material of the screw 330, the worker may perform the operation of removing or attaching the screw 330, and the determining part 713 may determine whether the operation of removing or attaching the screw 330 has been performed.

Also, according to a modification, there may be a case where the operation of removing or attaching the screw 330 is performed and yet the screw 330 is not replaced. For example, even when the screw 330 to remove and the screw 330 to attach are the same, the check ring that is attached to the tip of the screw 330 may be changed. In specific procedures of the operation, the worker removes the screw 330, removes the members as required when changing parts, and installs the replacement part to which the screw 330 is attached. Subsequently, after the replacement part is replaced, the worker reinstalls the screw 330. The determining part 713 may then determine whether or not such removing or attaching operation has been performed.

Furthermore, an example of the case where the operation of removing or attaching the screw 330 is performed but the screw 330 is not replaced, is when replacing the cylinder 310. The worker removes the screw 330 and the cylinder 310, and replaces the cylinder 310. Subsequently, the worker reinstalls the replacement cylinder 310 and the screw 330. Thus, although the screw 330 is not replaced, settings that relate to the screw 330 (for example, the upper limit value of pressure) need to be changed. Consequently, the determining part 713 may determine whether or not such removing or attaching operation has taken place.

In this way, the removing or attaching operation of the screw 330 is performed so as to suit the details of molding, as when changing the diameter of the screw 330. The details of molding may include, for example, the weight of the molded product, the type of resin, the cycle time, the required pressure, the cost of parts to be replaced, and so on.

When the determining part 713 determines that the operation of removing or attaching the screw 330 has been performed, the display control part 714 (an example of an output part) outputs a selection screen, on which the diameter of the screw 330 is receivable as input, on the display device 760. Note that, with the display control part 714 according to the present embodiment, the selection screen does not necessarily have to be displayed on the display device 760, and may be displayed, for example, on a communication terminal that is connected via a communication channel. Note that, according to the present embodiment, the check information that prompts checking of the diameter of the screw 330 does not necessarily have to be a selection screen, and other types of information such as voice, for example, may be used as well.

The receiving part 715 receives as input the diameter of the screw 330 (an example of a predetermined operation), in the selection screen displayed on the display device 760.

The setting part 716 configures the settings in accordance with the diameter of the screw 330 received as input in the receiving part 715. By this means, the control device 700 becomes capable of control in accordance with the changed diameter of the screw 330.

The operation control part 717 controls the operations related to the plasticizing device including the injection device 300. For example, when the determining part 713 determines that the screw 330 has been removed or attached, the operation control part 717 limits the operations of the plasticizing device until the receiving part 715 receives as input the diameter of the screw 330 and configures the settings in accordance with the diameter received as input.

The processes of the plasticizing device to be limited include production of molded products (injection operation), discharging (purging) of resin, and so forth. Specific control includes limiting the operations of the injection motor 350. By limiting the operations of the injection motor 350, the operations of the measurement motor 340 are in effect limited as well. Thus, when the diameter of the screw 330 is changed, the operations of the plasticizing device are limited until the setting is complete, so that it is possible to prevent load from being produced due to operations based on wrong settings. By having the configuration described above, the control device 700 according to the present embodiment can automatically detect changes in the diameter of the screw 330, and, when detecting a change, limit the operations of the plasticizing device until the diameter of the screw 330 is received as input from the worker.

[Example of Selection Screen]

Figure 6:
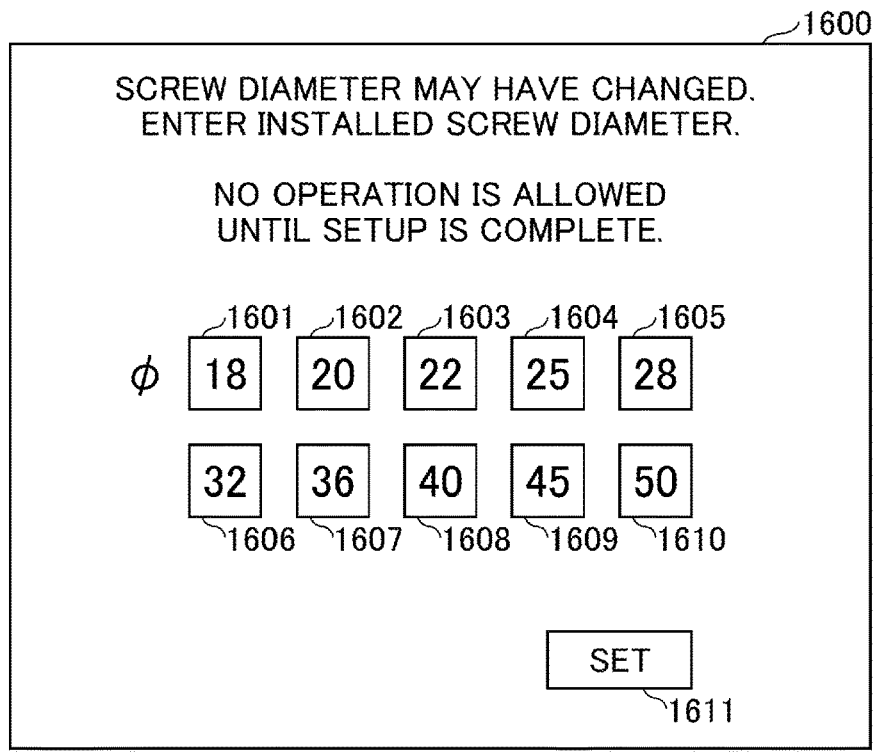
FIG. 6 is a diagram showing a first example of a selection screen output by a display control part according to the first embodiment.

FIG. 6 shows a first example of the selection screen output by the display control part 714. In the example selection screen shown in FIG. 6, buttons corresponding to selectable diameters of the screw 330 are displayed. Each button on the selection screen has a number indicating a screw diameter. For example, the selection screen displays an "18" button 1601, a "20" button 1602, a "22" button 1603, a "25" button 1604, a "28" button 1605, a "32" button 1606, a "36" button 1607, a "40" button 1608, a "45" button 1609, and a "50" button 1610.

The receiving part 715 receives the pressing operation of any one of these buttons 1601 to 1610. Subsequently, when the receiving part 715 receives the pressing operation of the setting button 1611, the display control part 714 ends the display of the selection screen, and the setting part 716 configures the settings in accordance with the diameter indicated by the pressed button (one of the buttons 1601 to 1610).

In the example shown in FIG. 6, the worker enters the diameter of the screw 330 by pressing a button. However, the manner of entering the diameter of the screw 330 is by no means limited to the pressing operation of a button.

Figure 7:
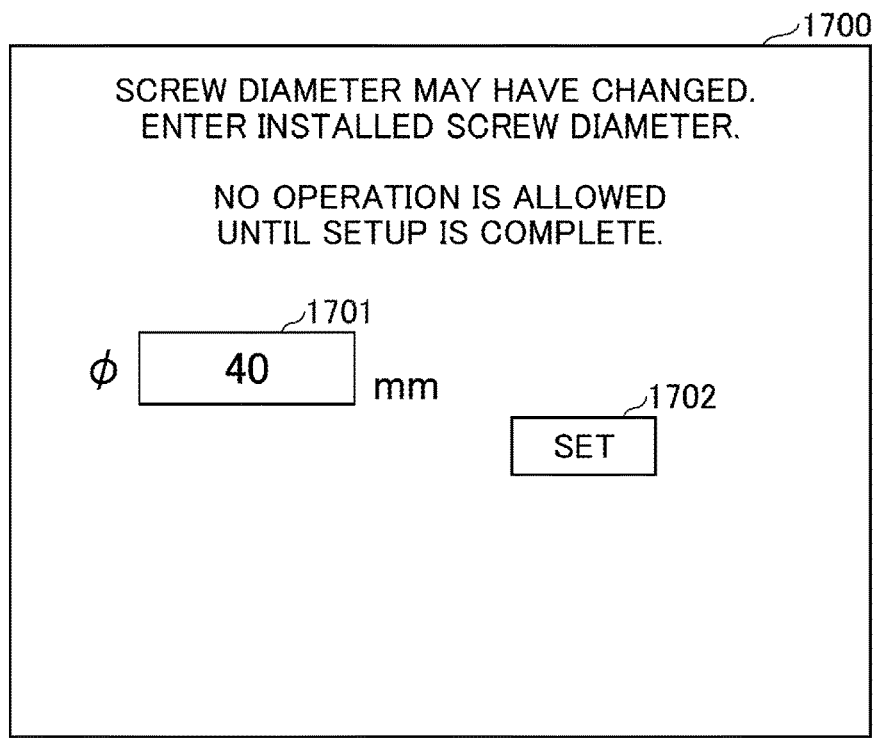
FIG. 7 is a diagram showing a second example of a selection screen output by the display control part according to the first embodiment.

FIG. 7 shows a second example of a selection screen that is output on the display control part 714. In the example selection screen shown in FIG. 7, an input column 1701 for the diameter of the screw 330 is displayed.

The receiving part 715 then receives as input a numerical value that corresponds to the diameter of the screw 330, in the input column 1701. Subsequently, when the receiving part 715 receives the pressing operation of the setting button 1702, the display control part 714 ends the display of the selection screen, and the setting part 716 configures the settings in accordance with the diameter received as input.

With the selection screens shown in FIG. 6 and FIG. 7, screens for receiving as input the diameter of the screw 330 have been explained. However, according to the present embodiment, the diameter of the screw 330 is by no means the only setting of the screw 330 that is receivable as input on the selection screen, and other settings may be received as input as well.

For example, the selection screen may receive as input the diameter of the screw 330, and may also receive as input the selection of the specification of an assembly (an example of a configuration) including the screw 330. A multiple-choice formula may be used to select the specification of the assembly that includes the screw 330. The options may include (A) standard, (B) high pressure, (C) ultra-high pressure, (D) high temperature, (E) thermoset, (F) high plasticization, (G) special 1, and (H) special 2. The receiving part 715 receives a selection from among these options. Then, the setting part 716 configures the settings in accordance with the option the receiving part 715 receives as input. For example, depending on the option selected, the setting part 716 changes a number of parameters such as the set upper limit value of the pressure that the screw 330 receives from the molding material, the upper limit temperature value for the cylinder 310, internal control values, and so forth.

The display control part 714 according to the present embodiment displays a selection screen for receiving as input the settings for the screw 330 that is removed or attached, and the receiving part 715 receives the settings related to the screw 330. By this means, it becomes easier to configure the settings of the screw 330 that is removed or attached, so that improved user-friendliness is achieved.

Figure 8:
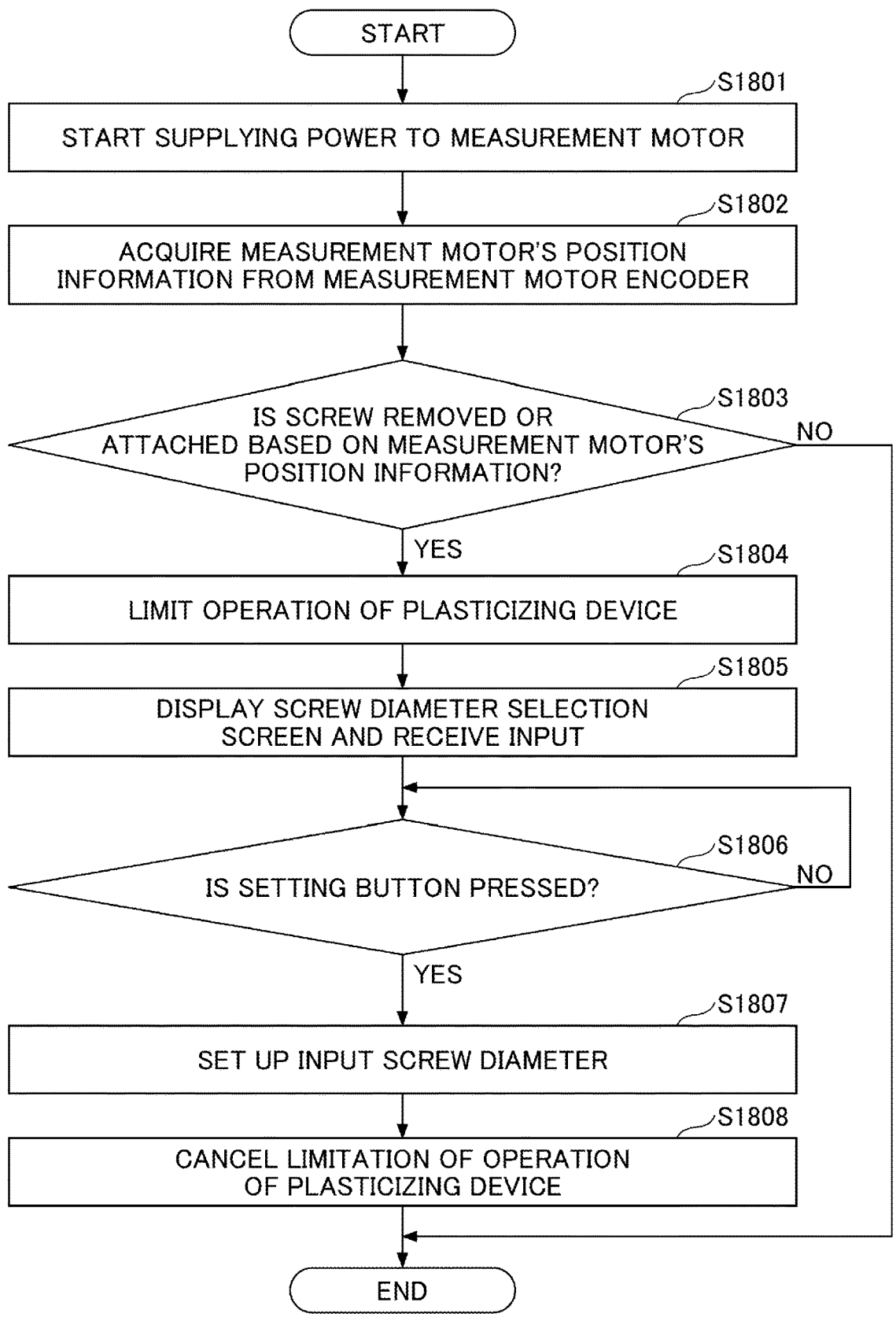
FIG. 8 is a flow chart showing processes related to the automatic determination of the screw diameter in the control device according to the first embodiment.

FIG. 8 is a flowchart showing processes related to the automatic determination of the diameter of the screw 330 in the control device 700 according to the present embodiment. The example shown in FIG. 8 shows the processes from the state in which the control of the screw 330 is turned off or from the state in which the injection molding machine 10 is powered off.

First, the control device 700 starts supplying power to the measurement motor 340, and turns on the control for the measurement motor 340 (S1801).

The acquiring part 711 acquires the second encoder position indicating the (rotational) position information of the measurement motor 340 from the measurement motor encoder 341 (S1802).

The determining part 713 determines whether or not the screw 330 has been removed or attached based on the difference between the first encoder position that is stored in the position information 721 of the memory medium 702 and the second encoder position (position information) of the motor 340 that is acquired by the acquiring part 711 (S1803). If the determining part 713 determines that the screw 330 has not been removed or attached (S1803: "NO"), the process ends.

On the other hand, if the determining part 713 determines that the screw 330 has been removed or attached (S1803: "YES"), the operation control part 717 limits the operations of the plasticizing device (including the injection device 300) (S1804).

Then, the display control part 714 displays a screen for selecting the diameter of the screw 330, and the receiving part 715 receives as input the diameter of the screw 330 from the selection screen (S1805).

Subsequently, the receiving part 715 determines whether or not the pressing operation of a setting button has been received (S1806). If the receiving part 715 determines that the pressing operation of a setting button has not been received (S1806: "NO"), the receiving part 715 stands by until the pressing operation of a setting button is received.

On the other hand, if the receiving part 715 determines that the pressing operation of a setting button has been received (S1806: "YES"), the setting part 716 sets the diameter of the screw 330 received as input (S1807).

Subsequently, the operation control part 717 cancels the limitation of the operations of the plasticizing device (S1808), and the process ends.

According to the present embodiment, by performing above-described control, it is possible to automatically determine whether or not the screw 330 has been removed or attached based on position information of the measurement motor 340. By this means, the present embodiment makes it possible to prevent a situation where, even though the diameter of the screw 330 has changed, the plasticizing device operates without reconfiguring the settings related to the screw 330 in accordance with the change.

Also, with the present embodiment, an example has been described in which, when it is determined that a screw 330 has been removed or attached, the diameter of the screw 330 is entered. However, the present embodiment is by no means limited to an example in which determining that the screw 330 has been removed or attached entails receiving the diameter of the screw 330 as input. For example, it is equally possible to receive parameters associated with changes in the shape or the material of the screw 330 as input, or to receive information regarding replacement of a replacement part as input. By this means, when the screw 330 is removed or attached, it is possible to change the settings in accordance with the removal or attachment of the screw 330.

Second Embodiment

With the first embodiment, an example of determining whether or not the screw 330 has been removed or attached based on the rotation position of the measurement motor 340 has been described. However, in the first embodiment, the rotation position of the measurement motor 340 is by no means the only information to use to determine whether or not the screw 330 has been removed or attached. Now, in a second embodiment an example of determining whether or not the diameter of the screw 330 has changed, or, in other words, whether or not the screw 330 has been removed or attached, based on response characteristics of the screw 330 will be described.

Figure 9:
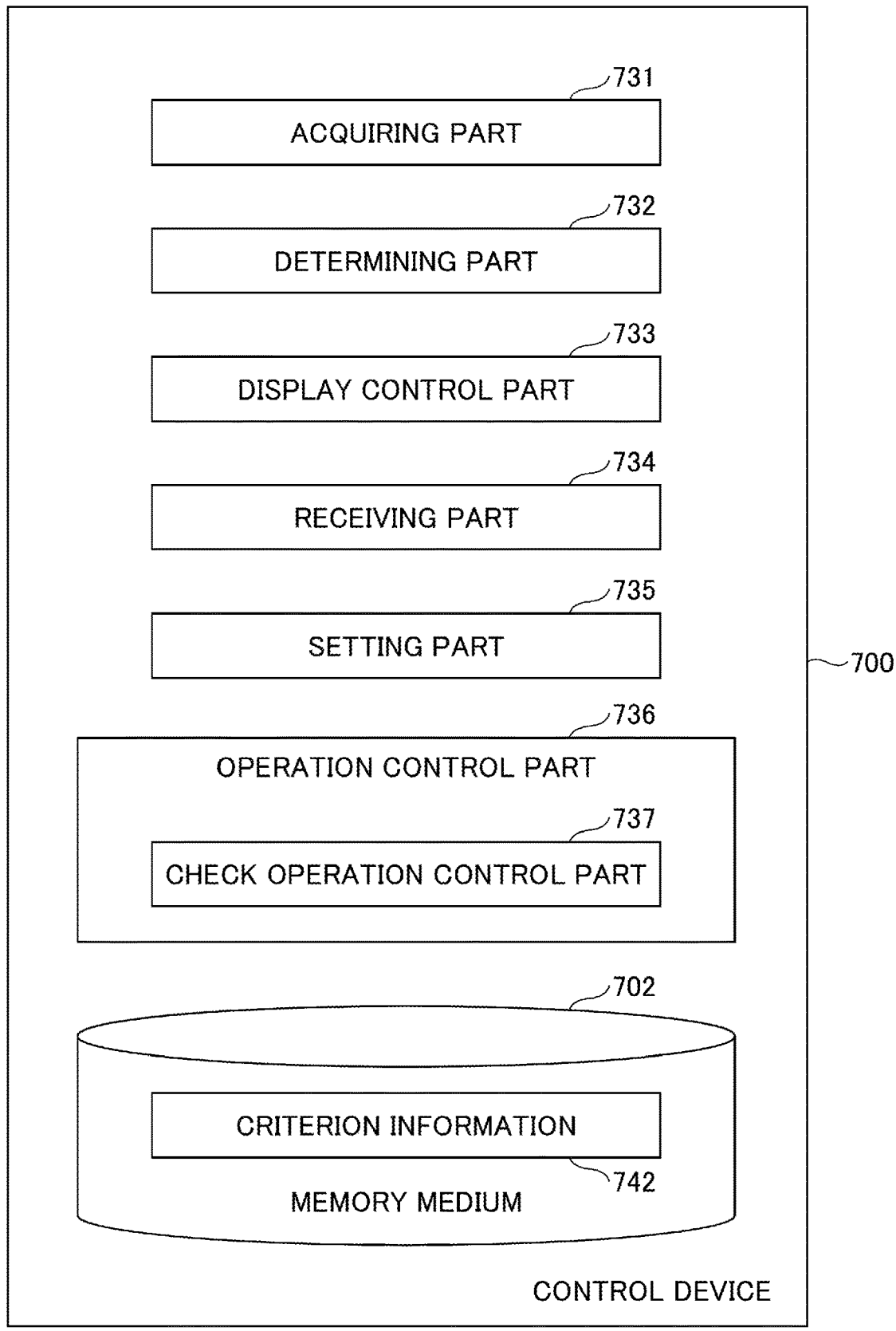
FIG. 9 is a functional block diagram showing the components of the control device according to a second embodiment.

FIG. 9 is a diagram showing components of the control device 700 according to the present embodiment in functional blocks. Note that the functional blocks shown in FIG. 9 are simply conceptual, and do not necessarily have to be physically configured as illustrated. All or part of the functional blocks can be functionally or physically distributed or integrated in arbitrary units. All or part of the processing functions performed by each functional block are implemented by programs executed by the CPU 701. Alternatively, each functional block may be implemented as hardware by wired logic. As shown in FIG. 9, the control device 700 has an acquiring part 731, a determining part 732, a display control part 733, a receiving part 734, a setting part 735, and an operation control part 736. Also, the memory medium 702 has an area for storing criterion information 742. Note that detailed description of each component will be provided later.

The memory medium 702 stores the response characteristics of the screw 330 on a per diameter basis, as criterion information 742 (an example of characteristic information), in order to determine whether or not the diameter of the screw 330 has changed.

With the present embodiment, the response characteristics of the screw 330 per diameter are represented by the data of electric-current waveforms that are used in control and detected when the screw 330 is rotated 90 degrees. That is, in the criterion information 742, the data of electric-current waveforms that are detected when the screw 330 is rotated by 90 degrees is stored, for each diameter of the screw 330.

When the diameter of the screw 330 varies, the inertia also varies per diameter, and so the torque changes when the screw 330 is rotated. Consequently, when the screw 330 rotates, the electric-current waveform to be detected varies per diameter of the screw 330. So, as the criterion for use in the present embodiment, electric-current waveform data is stored for each diameter of the screw 330.

For example, the thinner the diameter of the screw 330, the lighter the screw 330, so that desired movement can be made with less power. Consequently, differences between the electric-current waveform data of each diameter of the screw 330 may include that, for example, the smaller the diameter, the smaller the output of the electric-current waveform.

The operation control part 736 includes a check movement control part 737, and controls the operations related to the plasticizing device including the injection device 300. For example, when the determining part 713 determines that the diameter of the screw 330 has changed, the operation control part 736 limits the operations of the plasticizing device until the receiving part 734 receives as input the diameter of the screw 330 and the settings are reconfigured in accordance with the diameter received as input.

When tuning on the control of the measurement motor 340, the check movement control part 737 controls the movement of the screw 330 so as to check, after the temperature of the cylinder 310 has increased, whether or not the diameter of the screw 330 has changed. To control the movement of the screw 330, the check movement control part 737 may control the screw 330 to swing, or may control the screw 330 to move by a certain amount. The check movement control part 737 according to the present embodiment, for example, causes the screw 330 to rotate 90 degrees.

The acquiring part 731 acquires various information from various sensors provided in the injection molding machine 10. For example, when the check movement control part 737 controls the movement of the screw 330, the acquiring part 731 acquires the data of the electric-current waveform (an example of a response characteristic) that is used to control the rotation of the screw 330.

The determining part 732 compares the electric-current waveform (an example of a response characteristic) corresponding to the movement of the screw 330, acquired by the acquiring part 731, and the electric-current waveform (an example of a response characteristic) corresponding to the presently-set diameter of the screw 330, stored in the memory medium 702, and determines if the difference between these electric-current waveforms is greater than or equal to a predetermined criterion. If the difference between the electric-current waveforms is equal to or greater than a predetermined criterion, the determining part 732 determines that the diameter of the screw 330 has changed, or, in other words, the screw 330 has been removed or attached. If the difference between the electric-current waveforms is less than the predetermined criterion, the determining part 732 determines that the screw 330 has not been removed or attached. Note that the predetermined criterion is defined according to the mode of implementation, and therefore its description is omitted here.

The processes by the display control part 733, the receiving part 734, and the setting part 735 are the same as in the first embodiment, and therefore their description is omitted here.

Figure 10:
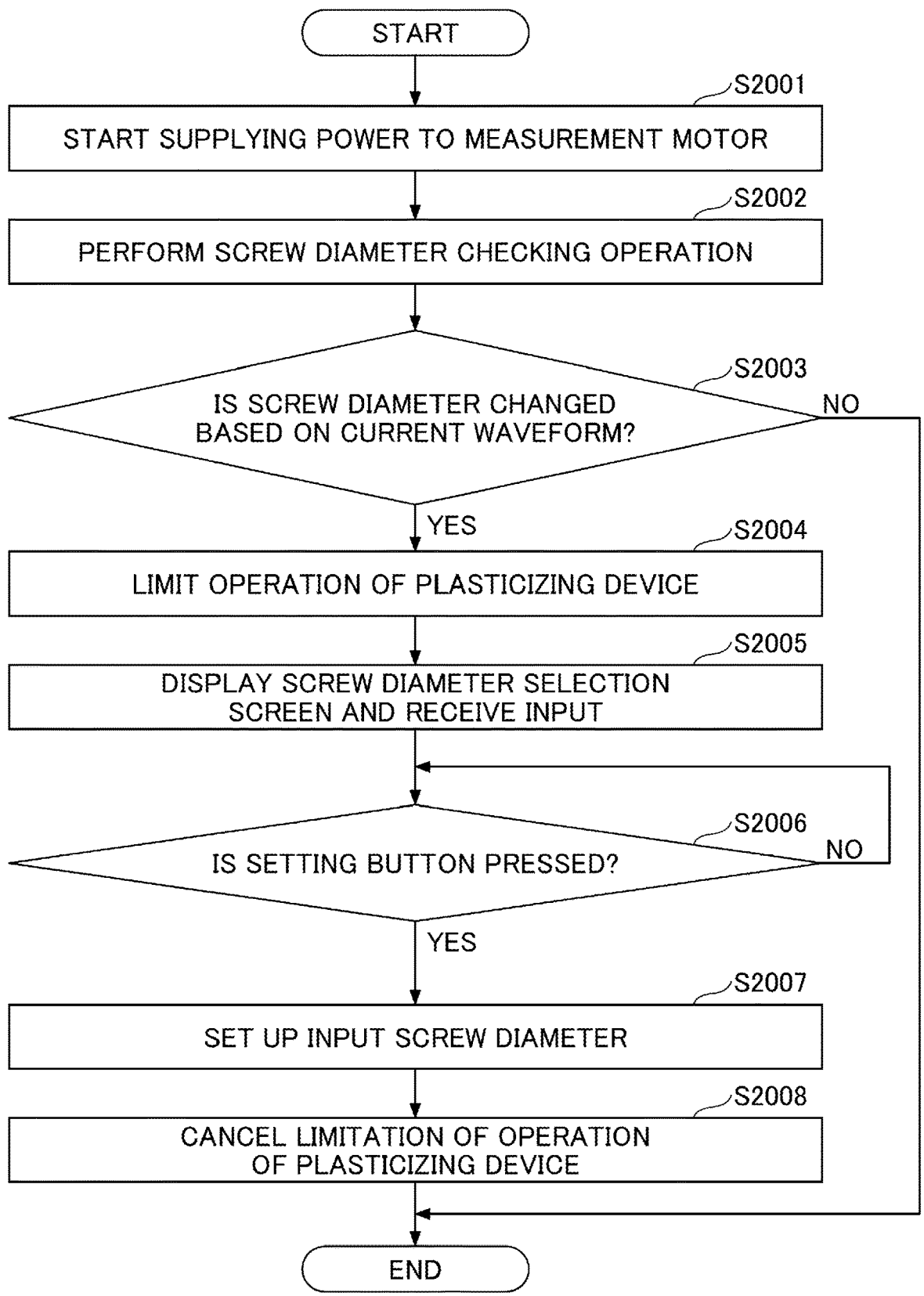
FIG. 10 is a flow chart showing processes related to the automatic determination of the screw diameter in the control device according to the second embodiment.

FIG. 10 is a flowchart showing processes related to the automatic determination of the diameter of the screw 330 in the control device 700 according to the present embodiment. The example in FIG. 10 shows the processes from the state in which the control of the screw 330 is turned off or from the state in which the injection molding machine 10 is powered off.

First, the control device 700 starts supplying power to the measurement motor 340, and turns on the control for the measurement motor 340 (S2001).

After the temperature of the cylinder 310 has increased, the check movement control part 737 performs a check movement for determining whether or not the diameter of the screw 330 has changed (S2002). The check movement is, for example, a movement to rotate the screw 330 by 90 degrees. Then, the acquiring part 731 acquires data of the electric-current waveform corresponding to that check movement.

The determining part 732 compares the electric-current waveform data corresponding to the presently-set diameter of the screw 330, stored in the criterion information 742 of the memory medium 702, with the electric-current waveform data acquired in the acquiring part 731, to determine whether or not the diameter of the screw 330 has changed (S2003). If the determining part 732 determines that the diameter of the screw 330 has not changed (S2003: "NO"), the process ends.

On the other hand, if the determining part 732 determines that the diameter of the screw 330 has changed (S2003: "YES"), the diameter of the screw 330 is set through the same processes shown as S1804 to S1808 in FIG. 8, and then the limitation of the operations of the plasticizing device is cancelled, and the process ends (S2004 to S2008).

According to the present embodiment, by performing above-described control, it is possible to automatically determine whether or not the diameter of the screw 330 has changed, based on response characteristics of the screw 330. By this means, the present embodiment makes it possible to prevent a situation where, even though the diameter of the screw 330 has changed, the plasticizing device operates without reconfiguring the settings related to the screw 330 in accordance with the change.

Also, an example has been described with the present embodiment in which whether or not the diameter of the screw 330 has changed is automatically determined based on response characteristics of the screw 330. However, changes with the screw 330 that can be detected based on response characteristics according to the present embodiment are by no means limited to the changes in the diameter of the screw 330 alone. That is, the determining part 732 can determine whether or not a change has taken place with respect to the screw 330 based on response characteristics. Consequently, for example, whether or not the check ring attached to the tip of the screw 330 or the like has changed may be determined.

A Modification of the Second Embodiment

A case of storing the response characteristics of the screw 330 per diameter has been described with the second embodiment. However, the second embodiment is by no means limited to the method of storing response characteristics on a per diameter basis. So, to illustrate a modification of the second embodiment, the data of the electric-current waveform detected when the check movement is performed before shipping from the factory is stored as criterion information 742.

In this case, the determining part 732 compares the electric-current waveform corresponding to the movement of the screw 330, acquired by the acquiring part 731 (an example of a response characteristic), and the electric-current waveform (an example of a response characteristic) detected before shipping from the factory, or, in other words, an electric-current waveform detected in the past and stored in the memory medium 702, to determine whether or not the screw 330 has been replaced, or, in other words, whether or not the screw 330 has been removed or attached, compared to the state before shipping from the factory. Note that the other processes are the same as in the second embodiment, and therefore their description is omitted here.

Furthermore, this modification is not limited to the example in which data of the electric-current waveform that is detected when the check movement is performed before shipping from the factory is stored as criterion information 742. That is, it suffices as long as the electric-current waveform data to be stored as criterion information 742 is data that is detected in the past. For example, the electric-current waveform data that was detected when the previous check movement was performed may be stored as criterion information 742. In other words, whether or not the screw 330 has been removed or attached may be determined by comparing the previously-detected electric-current waveform with the electric-current waveform (an example of a response characteristic) acquired by the acquiring part 731 and corresponding to the movement of the screw 330.

Third Embodiment

Cases have been described with the above embodiments where the worker enters the diameter of the screw 330 when it is determined that the diameter of the screw 330 has changed. However, the above-described embodiments are by no means limited to the method of receiving the diameter of the screw 330 as input. Now, in a third embodiment, a case in which the diameter of the screw 330 is set automatically will be described.

The third embodiment shall have the same configuration as the second embodiment. Also, the criterion information 742 in the memory medium 702 stores electric-current waveform data on a per diameter basis.

Figure 11:
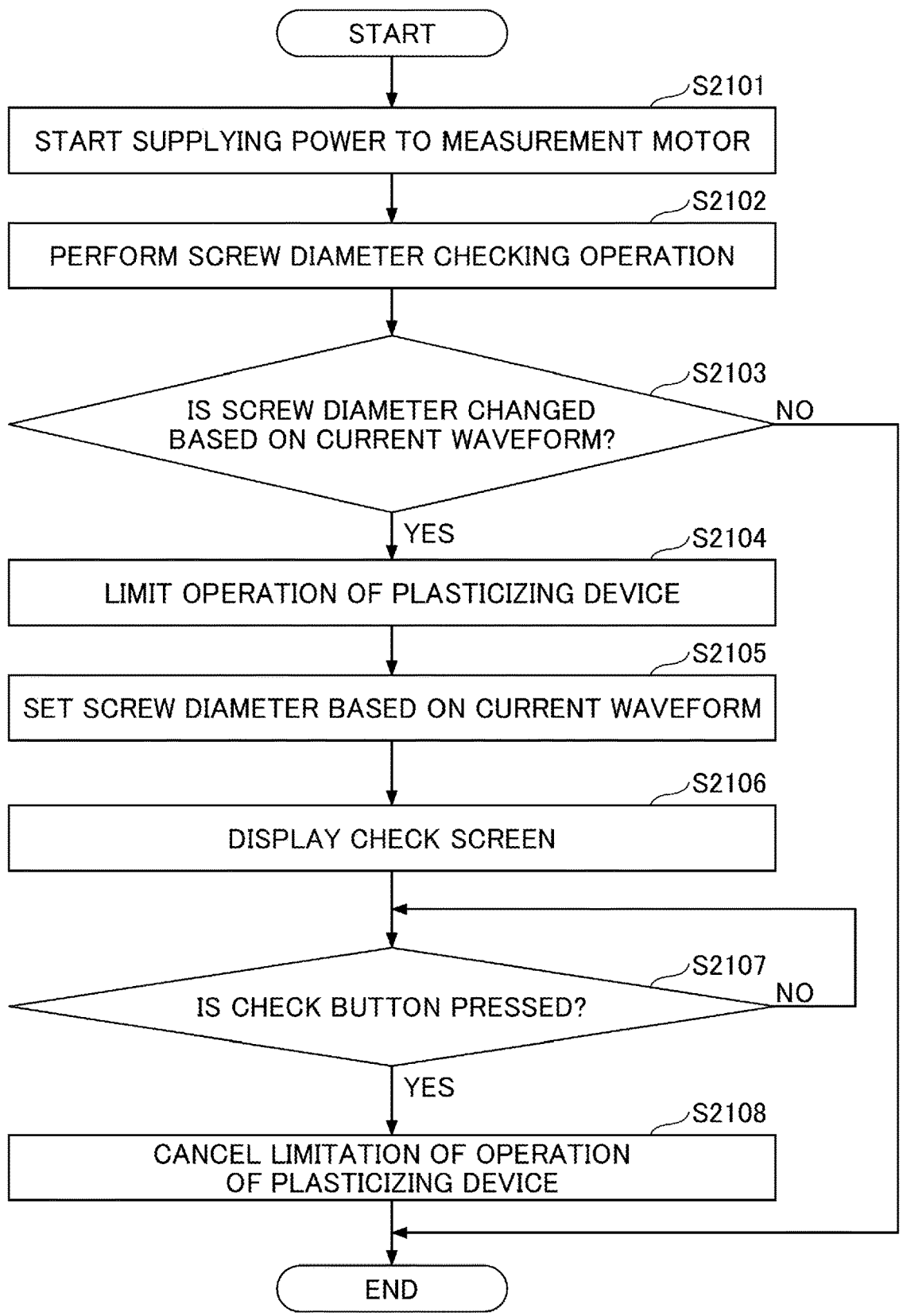
FIG. 11 is a flow chart showing processes related to the automatic setting of the screw diameter in the control device according to a third embodiment.

FIG. 11 is a flow chart showing the processes related to the automatic setting of the diameter of the screw 330 in the control device 700 according to the present embodiment. The example in FIG. 11 shows the processes from the state in which the control of the screw 330 is turned off or the state in which the injection molding machine 10 is powered off.

First, the control device 700 starts supplying power to the measurement motor 340, and turns on the control for the measurement motor 340 (S2101).

After the temperature of the cylinder 310 has increased, the check movement control part 737 performs a check movement for determining whether or not the diameter of the screw 330 has changed (S2102). The check movement is, for example, a movement to rotate the screw 330 by 90 degrees. Then, the acquiring part 731 acquires data of the electric-current waveform corresponding to that check movement.

The determining part 732 compares the electric-current waveform data corresponding to the presently-set diameter of the screw 330, stored in the criterion information 742 of the memory medium 702, with the electric-current waveform data acquired in the acquiring part 731, to determine whether or not the diameter of the screw 330 has changed (S2103). When the determining part 732 determines that the diameter of the screw 330 has not changed (S2103: "NO"), the process ends.

Conversely, when the determining part 732 determines that the diameter of the screw 330 has changed (S2103: "YES"), the operation control part 736 limits the operations of the plasticizing device (including the injection device 300) (S2104).

Then, the setting part 735 configures the settings based on the diameter of the screw 330 according to the electric-current waveform data acquired by the acquiring part 731 (S2105). The criterion information 742 stores electric-current waveform data and diameters of the screw 330 in association with each other. When the determining part 732 makes the determination, the determining part 732 compares the presently-acquired electric-current waveform data, with the electric-current waveform data associated with respective diameters, so that the determining part 732 can specify the diameter that matches the electric-current waveform data acquired by the acquiring part 731. By this means, the setting part 735 can configure the settings in accordance with the specified diameter.

Then, the display control part 733 displays a screen for checking the diameter of the screw 330 set by the setting part 735 (S2106). On the screen for checking the diameter of the screw 330, a check button is displayed with the set diameter of the screw 330. Note that, if the diameter of the screw 330 displayed on the check screen is not correct, the diameter of the screw 330 may be reconfigured in the same manner as in the above-described embodiments.

Subsequently, the receiving part 734 determines whether or not the pressing operation of the check button has been received (S2107). If the receiving part 734 determines that no press of the check button has been received (S2107: "NO"), the receiving part 734 waits until the press is received.

On the other hand, when the receiving part 734 determines that the check button has been pressed (S2107: "YES"), the operation control part 717 cancels the limitation of the operations of the plasticizing device (S2108), and the process ends.

Thus, the display control part 733 according to the present embodiment outputs a check screen for checking the set diameter. Note that, although an example to output a check screen has been described with the present embodiment, what is to be output is by no means limited to a check screen, and any information related to checking may be output.

With the present embodiment, the diameter of the screw 330 is set automatically according to electric-current waveform data, so that the worker's burden pertaining to the settings can be reduced.

[Effects]

With the embodiments described above, it is possible to automatically detect whether the screw 330 has been removed or attached. By this means, even if the worker forgets to change the settings of the screw 330, the control device 700 detects when the screw 330 is removed or attached, and outputs check information to the worker (for example, displays a selection screen, displays a check screen, and so forth). By this means, the worker is able to see the present settings of the screw 330, such as the diameter of the screw 330, so that it is possible to prevent operations based on parameters that do not match the present screw 330. By this means, it is possible to reduce the load that is produced in the injection molding machine 10 and the mold device 800 due to control based on wrong parameters.

In the embodiments described above, after removal or attachment of the screw 330 is detected, the operations of the plasticizing device are limited until the worker confirms this. By this means, it is possible to improve safety by preventing operations based on wrong settings.

In the embodiments described above, the settings of the screw 330, such as the diameter of the screw 330, are received as input from the worker while the operations of the plasticizing device are limited, so that appropriate parameter setting is enabled, and improved safety is achieved.

Although an embodiment of the display device for an injection molding machine according to the present invention has been described above, the present invention is not limited to the above embodiment. Various changes, modifications, substitutions, additions, deletions, and combinations are possible within the scope of the claims.

What is claimed is:

1. A control device for an injection molding machine, the control device comprising:
    a detecting part configured to detect a rotation position of a measurement motor,
    a storage part configured to store a first rotational position indicating a rotational position of the measurement motor when control of the measurement motor is stopped,
    a determining part configured to determine, based on the first rotational position and a second rotational position indicating the position of the measurement motor when the control of the metering motor is turned on, whether or not an operation of removing or attaching a screw that rotates in accordance with the measurement motor has been performed between a time when the control of the measurement motor is stopped and the time when the control of the measurement motor is turned on.

2. The control device for the injection molding machine according to claim 1, further comprising:
    a saving part configured to save a first encoder position in a memory part when the control of the measurement motor of the injection molding machine is stopped, the first encoder position indicating a rotation position of the measurement motor,
    wherein, when the control of the measurement motor is turned on, the determining part determines whether or not the operation of removing or attaching the screw has been performed, based on whether or not a difference between the first encoder position and a second encoder position is equal to or greater than a predetermined value, the second encoder position indicating the rotation position of the measurement motor detected when the control of the measurement motor is turned on.

3. The control device for the injection molding machine according to claim 1, further comprising:
    a memory part configured to store characteristic information indicating a response characteristic of the screw,
        wherein, when the control of the measurement motor is turned on, the determining part causes the screw to make a predetermined movement, and determines whether or not the operation of removing or attaching the screw has been performed, based on a difference between a response characteristic corresponding to the predetermined movement of the screw, and the response characteristic indicated by the characteristic information stored in the memory part.

4. The control device for the injection molding machine according to claim 3,
   wherein the memory part stores the characteristic information indicating the response characteristic of the screw detected in past.

5. The control device for the injection molding machine according to claim 4,
   wherein the memory part stores the characteristic information for each diameter of the screw, and
   wherein the control device further comprises a setting part configured to specify, when the determining part determines that the operation of removing or attaching the screw has been performed, a diameter of the screw corresponding to the response characteristic detected upon the predetermined movement, and to configure a setting based on the diameter of the screw.

6. The control device for the injection molding machine according to claim 1, further comprising:
   an output part configured to output check information for prompting checking of a setting of the screw when the determining part determines that the operation of removing or attaching the screw has been performed;
   a receiving part configured to receive as input a predetermined operation corresponding to the check information output by the output part; and
   a control part configured to limit an operation of a plasticizing device until the receiving part receives as input the predetermined operation, the plasticizing device being a component configured to allow rotational plasticization by the screw.

7. The control device of the injection molding machine according to claim 6,
   wherein the check information that is output by the output part is a screen indicating that a diameter of the screw and a specification of a configuration including the screw are receivable as input, and
   wherein, as the predetermined operation, the receiving part receives as input the diameter of the screw and the specification of the configuration including the screw.

* * * * *